United States Patent
Suzuki

(10) Patent No.: US 12,306,289 B2
(45) Date of Patent: *May 20, 2025

(54) RADAR DEVICE, METHOD OF DETECTING FAILURE OF RADAR DEVICE, AND METHOD OF OPERATING RADAR DEVICE

(71) Applicant: Mitsubishi Electric Corporation, Tokyo (JP)

(72) Inventor: Takuya Suzuki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/515,301

(22) Filed: Nov. 21, 2023

(65) Prior Publication Data

US 2024/0094371 A1 Mar. 21, 2024

Related U.S. Application Data

(62) Division of application No. 15/734,235, filed as application No. PCT/JP2018/031417 on Aug. 24, 2018, now Pat. No. 11,921,186.

(30) Foreign Application Priority Data

Jun. 7, 2018 (JP) .................. 2018-109816

(51) Int. Cl.
*G01S 13/34* (2006.01)
*G01S 7/35* (2006.01)
*G01S 7/40* (2006.01)

(52) U.S. Cl.
CPC .............. *G01S 13/34* (2013.01); *G01S 7/352* (2013.01); *G01S 7/4021* (2013.01); *G01S 7/356* (2021.05)

(58) Field of Classification Search
None
See application file for complete search history.

(56) References Cited

U.S. PATENT DOCUMENTS 6,127,965 A 10/2000 McDade et al.
2007/0171123 A1 7/2007 Nakano et al.
(Continued)

FOREIGN PATENT DOCUMENTS

JP H05-19045 A 1/1993
JP 2006-250793 A 9/2006
(Continued)

OTHER PUBLICATIONS

Chinese Office Action issued Nov. 1, 2023 in corresponding Chinese Patent Application No. 201880094195.7, 40 pages.
(Continued)

*Primary Examiner* — Whitney Moore
(74) *Attorney, Agent, or Firm* — XSENSUS LLP

(57) ABSTRACT

A radar device includes a transmission module that generates a transmission chirp signal, and reception modules that each receive a reflected wave and a direct wave of the transmission chirp signal, and perform mixing on a received signal, using a reception chirp signal. The radar device includes a signal processing unit that detects a target on the basis of a beat signal resulting from the mixing performed by the reception modules. The signal processing unit detects a level of the beat signal generated from the received direct wave. The signal processing unit determines a failure of the radar device by comparing the detected level with a threshold set on the basis of a beat signal level measurement under an environment that eliminates the reflected wave in advance. The transmitted chirp signal distributed from the transmission module is used as the reception chirp signal.

11 Claims, 23 Drawing Sheets

(56) References Cited

U.S. PATENT DOCUMENTS

2012/0235859 A1   9/2012   Hayase
2015/0097718 A1   4/2015   Sato

FOREIGN PATENT DOCUMENTS

| JP | 2006-275776 A | 10/2006 |
| JP | 2007-198846 A | 8/2007 |
| JP | 2008-032495 A | 2/2008 |
| JP | 2009-109370 A | 5/2009 |

OTHER PUBLICATIONS

International Search Report and Written Opinion mailed on Nov. 20, 2018, received for PCT Application No. PCT /J P2018/031417, Filed on Aug. 24, 2018, 9 pages.

FIG.7

| | | AMBIENT TEMPERATURE | $T_{min}$ | $T_1$ | $T_2$ | ... | $T_{max}$ |
|---|---|---|---|---|---|---|---|
| TRANSMISSION UNIT (#1) | RECEPTION UNIT (#11) | AMPLITUDE | *** | *** | *** | ... | *** |
| | | FREQUENCY | *** | *** | *** | ... | *** |
| | RECEPTION UNIT (#12) | AMPLITUDE | *** | *** | *** | ... | *** |
| | | FREQUENCY | *** | *** | *** | ... | *** |
| | ... | AMPLITUDE | *** | *** | *** | ... | *** |
| | | FREQUENCY | *** | *** | *** | ... | *** |
| TRANSMISSION UNIT (#2) | RECEPTION UNIT (#21) | AMPLITUDE | *** | *** | *** | ... | *** |
| | | FREQUENCY | *** | *** | *** | ... | *** |
| | RECEPTION UNIT (#22) | AMPLITUDE | *** | *** | *** | ... | *** |
| | | FREQUENCY | *** | *** | *** | ... | *** |
| | ... | AMPLITUDE | *** | *** | *** | ... | *** |
| | | FREQUENCY | *** | *** | *** | ... | *** |
| ... | | | | ... | | | |

CHIRP SIGNAL FOR FAILURE DETECTION
(MODULATED)

CHIRP SIGNAL FOR FAILURE DETECTION
(UNMODULATED)

RADAR DEVICE, METHOD OF DETECTING FAILURE OF RADAR DEVICE, AND METHOD OF OPERATING RADAR DEVICE

CROSS-REFERENCE TO RELATED APPLICATIONS

The present application is a divisional application of U.S. application Ser. No. 15/734,235 filed on Dec. 2, 2020, which is based on PCT filing PCT/JP2018/031417, filed Aug. 24, 2018, which claims priority to Japanese Patent Application No. 2018-109816 filed Jun. 7, 2018, the entire contents of each are incorporated herein by reference.

FIELD

The present invention relates to a radar device that detects a target, a method of detecting a failure of the radar device, and a method of operating the radar device.

BACKGROUND

Patent Literature 1 below discloses a technique that detects the level of a reflected wave from a vehicle ahead and the level of a reflected wave from a road surface in front of a vehicle, and determines a failure of a radar device on the basis of the level of the reflected wave from the vehicle and the level of the reflected wave from the road surface.

CITATION LIST

Patent Literature

Patent Literature 1: Japanese Patent Application Laid-open No. 2006-250793

SUMMARY

Technical Problem

Such a conventional radar device as disclosed in Patent Literature 1 uses reflected waves from, for example, a vehicle ahead, a road surface, and a radome in determining a failure of the radar device. However, signals resulting from these reflected waves constantly change in level depending on the distance to the vehicle, the vehicular speed, the state of the road surface or radome, and the amount of reflection from the road surface or radome. It is thus highly likely that stable reflected waves are not obtained steadily depending on the condition or state. In order to detect a failure during operation, therefore, the conventional radar device needs to avoid false determination and/or impose limitation on the condition of the reflected waves. As a result, the conventional radar device is so limited in terms of the function that the radar device fails to function in a versatile manner. It is thus desired to stably detect a failure during operation without using the reflected waves.

The present invention has been made in view of the above, and an object of the present invention is to provide a radar device capable of stably detecting a failure during operation without using a reflected wave.

Solution to Problem

In order to solve the above problem and achieve the object, a radar device according to the present invention comprises at least one transmission module to generate a transmission chirp signal synchronized with a timing signal. The device also comprises at least two reception modules to each receive a reflected wave of the transmission chirp signal emitted from the transmission module, and a direct wave of the transmission chirp signal, and perform mixing on a received signal, using a reception chirp signal, the reflected wave being reflected from a target, the direct wave providing direct coupling without passing through the target, the reception chirp signal being synchronized with the timing signal and having the same slope as the transmission chirp signal. The device further comprises a signal processing unit to detect the target on the basis of a beat signal resulting from the mixing performed by the reception modules. The signal processing unit includes a function that detects a level of a direct wave component from the transmission module to the reception modules, the direct wave component being included in the beat signal, and determines a failure of the radar device by comparing the detected level with a threshold, the threshold being set on the basis of a beat signal level measurement under an environment that eliminates the reflected wave in advance.

Advantageous Effects of Invention

The radar device according to the present invention provides an effect of stably detecting the failure during the operation without using the reflected wave.

BRIEF DESCRIPTION OF DRAWINGS

FIG. 7 is a table illustrating an example of a threshold table used for failure determination in the first embodiment.

DESCRIPTION OF EMBODIMENTS

Hereinafter, a radar device, a method of detecting a failure in the radar device, and a method of operating the radar device according to embodiments of the present invention will be described in detail with reference to the drawings. Note that the present invention is not limited to the following embodiments.

First Embodiment

Figure 1:
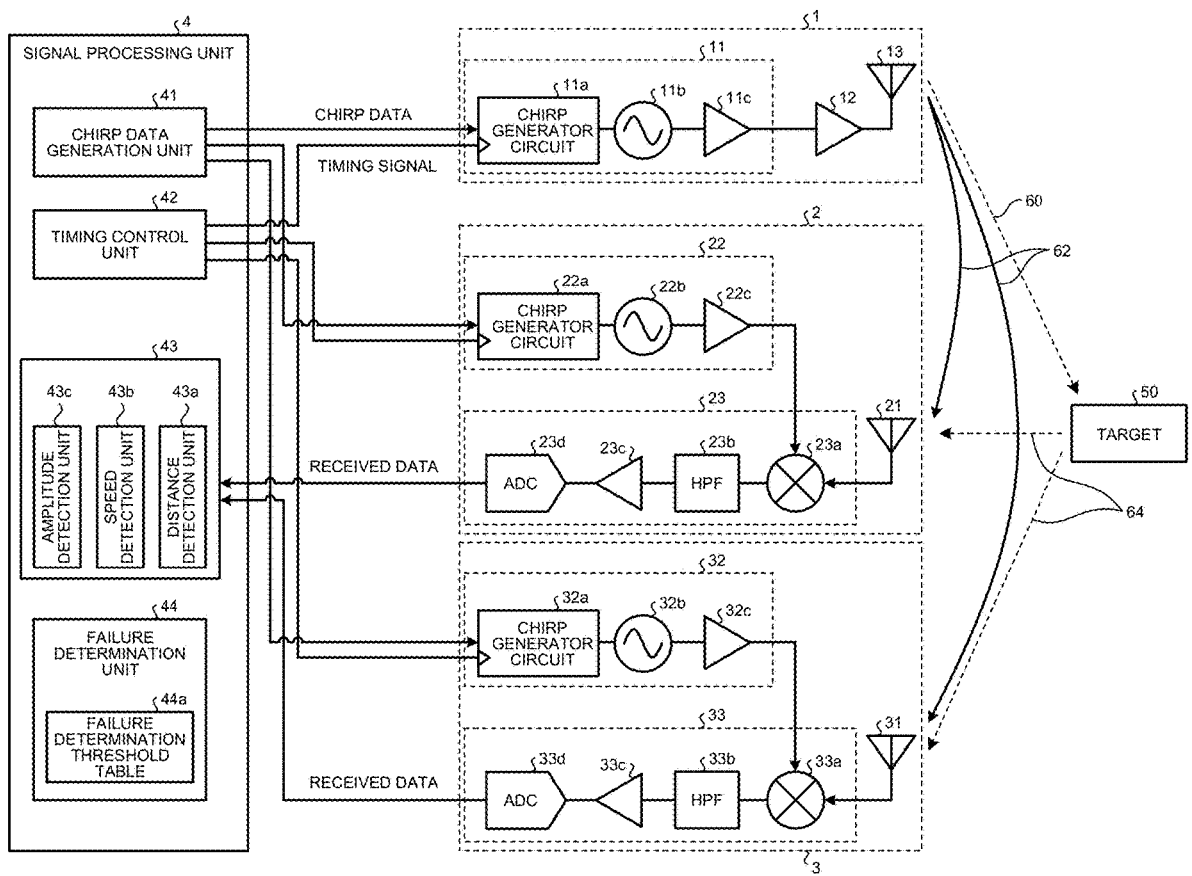
FIG. 1 is a block diagram illustrating an example of a radar device according to a first embodiment.
Figure 2:
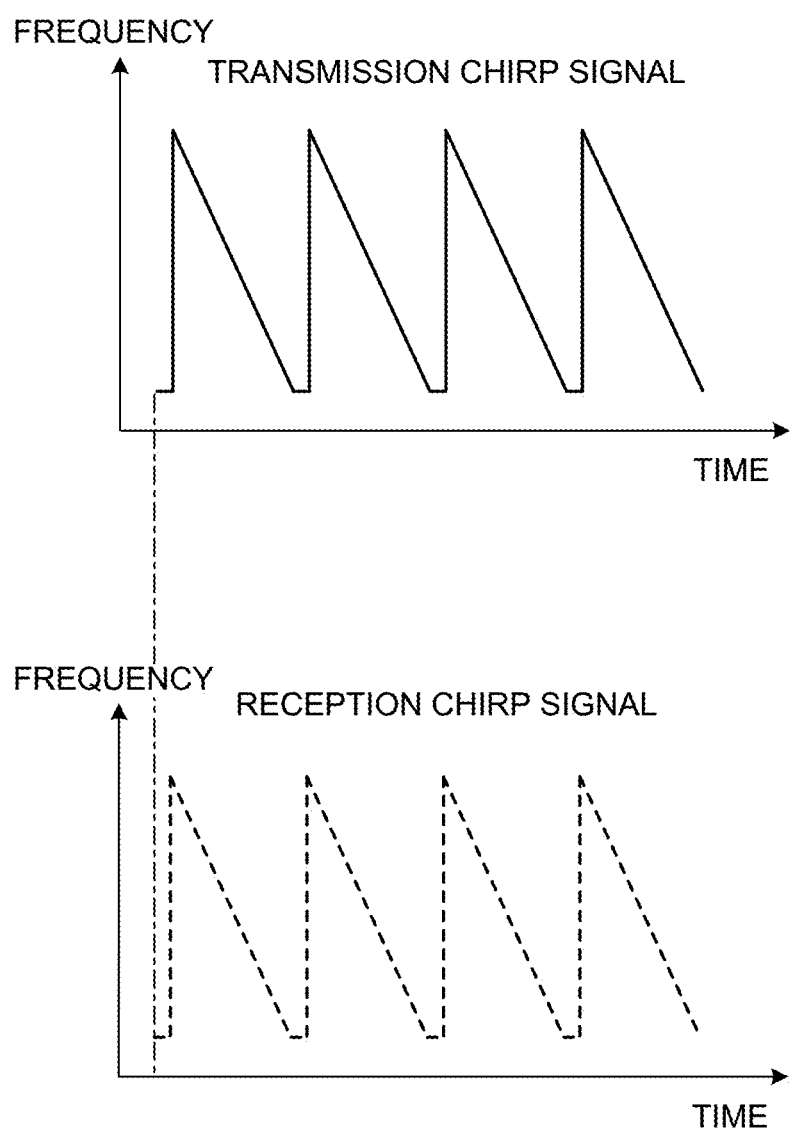
FIG. 2 is a set of graphs illustrating time-frequency waveforms of a transmitted chirp signal and a received chirp signal in the first embodiment.

FIG. 1 is a block diagram illustrating an example of a radar device according to a first embodiment. FIG. 2 is a set of graphs illustrating time-frequency waveforms of a transmitted chirp signal and a received chirp signal in the first embodiment. As illustrated in FIG. 1, a radar device 100 according to the first embodiment includes one transmission module 1, two reception modules 2 and 3, and a signal processing unit 4. Note that the one transmission module is provided by way of example, and the radar device 100 may include a plurality of the transmission modules. Also, the two reception modules are provided by way of example, and the radar device 100 may include one or three or more of the reception modules.

The transmission module 1 is a module that emits, into space, a transmission chirp signal illustrated in the top diagram of FIG. 2. The transmission module 1 includes a radio frequency (RF) signal source 11, an amplifier 12, and a transmitting antenna 13. The RF signal source 11, which is a first signal source, generates the transmission chirp signal synchronized with a timing signal that is output from the signal processing unit 4. The amplifier 12 amplifies the transmission chirp signal generated by the RF signal source 11. The transmitting antenna 13 emits, into space, a transmission chirp signal 60 amplified by the amplifier 12. The timing signal input to the RF signal source 11 is generated by a timing control unit 42. The timing control unit 42 is provided in the signal processing unit 4.

The RF signal source 11 includes a chirp generator circuit 11a, an oscillator 11b, and an amplifier 11c. The chirp generator circuit 11a generates a control signal for controlling the oscillation frequency of the oscillator 11b on the basis of chirp data. The oscillator 11b generates the transmission chirp signal whose frequency changes with time, in accordance with the control signal generated by the chirp generator circuit 11a. The amplifier 11c amplifies the transmission chirp signal generated by the oscillator 11b. Note that the amplifier 12 may be removed from the transmission module 1 when the amplifier 11c can obtain a sufficient output. Chirp parameters input to the chirp generator circuit 11a are generated by a chirp data generation unit 41. The chirp data generation unit 41 is provided in the signal processing unit 4.

The reception modules 2 and 3 are modules that each receive a reflected wave 64 of the transmission chirp signal 60 emitted into space, the reflected wave 64 being reflected from a target 50. Also, as illustrated in FIG. 1, there exists a direct wave 62 for direct coupling from the transmission module 1 to the reception modules 2 and 3, and thus the reception modules 2 and 3 each receive the direct wave 62 as well and perform the following processing.

The reception module 2 includes a receiving antenna 21, an RF signal source 22, and a reception unit 23. The receiving antenna 21 receives the direct wave 62 from the transmission module 1 and the reflected wave 64 from the target 50. The RF signal source 22, which is a second signal source, generates a reception chirp signal. The reception chirp signal is synchronized with the timing signal output from the timing control unit 42 and has the same slope as the transmission chirp signal. The reception chirp signal functions as a received local (LO) signal for a mixer described later. As illustrated in FIG. 2, the reception chirp signal is a chirp signal whose frequency changes with time as in the transmission chirp signal. The reception unit 23 down-converts the received signal received via the receiving antenna 21 and converts the down-converted signal into a digital signal. The reception unit 23 outputs the down-converted signal to the signal processing unit 4 as received data.

The RF signal source 22 includes a chirp generator circuit 22a, an oscillator 22b, and an amplifier 22c. The chirp generator circuit 22a generates a control signal for controlling the oscillation frequency of the oscillator 22b on the basis of chirp data output from the chirp data generation unit 41. The oscillator 22b generates a signal according to the control signal generated by the chirp generator circuit 22a. The amplifier 22c amplifies the signal generated by the oscillator 22b. The signal output from the amplifier 22c is the reception chirp signal described above.

The reception unit 23 includes a mixer 23a, a high-pass filter (HPF) 23b, an amplifier 23c, and an analog-to-digital converter (ADC) 23d. Using the reception chirp signal that is the received LO signal, the mixer 23a perform mixing on the received signal received via the receiving antenna 21, thereby generating a frequency difference signal (i.e., a beat signal) between the received signal and the reception chirp signal. The HPF 23b filters the output of the mixer 23a, that is, the beat signal. To detect the target 50, a direct current component and a predetermined low-frequency component included in the beat signal are suppressed by the HPF 23b. The amplifier 23c amplifies the signal output from the HPF 23b. The ADC 23d converts the output of the amplifier 23c into a digital signal. Note that although not shown, sampling by the ADC 23d is controlled by the signal processing unit 4 as is the case with the chirp generator circuits 11a, 22a, and 32a, and the sampling is performed in synchronization with the timing at which each chirp signal is generated.

The reception module 3 has a configuration similar to that of the reception module 2. The reception module 3 includes a receiving antenna 31, an RF signal source 32, and a reception unit 33. The RF signal source 32 includes the chirp generator circuit 32a, an oscillator 32b, and an amplifier 32c. The reception unit 33 includes a mixer 33a, an HPF 33b, an amplifier 33c, and an ADC 33d. The functions of the RF signal source 32 and the reception unit 33 will not be described here as they are similar to the functions of the RF signal source 22 and the reception unit 23 of the reception module 2, respectively. Note that while the amplifier 12 amplifies the transmission chirp signal generated by the RF signal source 11 in the illustrated example, the amplifier 12 may be defined by a combination of an N multiplier and an amplifier in which case the mixers 23a and 33a of the reception modules 2 and 3 are harmonic mixers. In this case, the frequencies of the transmission chirp signal and the reception chirp signal generated by the chirp generator circuits 11a, 22a, and 32a are set to 1/N of the transmission/reception frequencies of the transmitting antenna 13 and the receiving antennas 21 and 31. With such a configuration, the RF signal sources 11, 22, and 32 can be implemented at low cost and with high output, thereby achieving a high-performance radar device as the radar device includes more transmission/reception modules and thus provides a large number of transmission/reception channels.

The signal processing unit 4 controls the chirp parameters that are parameters of the chirp signals generated by the RF signal sources 11, 22, and 32 and the timing, and performs signal processing on the digital signal obtained by the conversion in the ADCs 23d and 33d. The chirp parameters include the frequency, the phase, and the delay time from a reference time when a chirp operation starts, the shape (such as the slope or the width of modulation) of the chirp signal, the time/frequency increments, the number of chirps, and the like. It is also possible to generate a combination of a plurality of different chirp signals.

The signal processing unit 4 includes a detection unit 43 and a failure determination unit 44 in addition to the chirp data generation unit 41 and the timing control unit 42 described above. The detection unit 43 includes a distance detection unit 43a, a speed detection unit 43b, and an amplitude detection unit 43c. The failure determination unit 44 includes a failure determination threshold table 44a. The failure determination threshold table 44a stores a threshold.

In the detection unit 43, the distance detection unit 43a detects the distance from the radar device 100 to the target 50 on the basis of the received data output from the reception units 23 and 33. The speed detection unit 43b detects the relative speed between the radar device 100 and the target 50 on the basis of the received data. The amplitude detection unit 43c detects the level of the received data. The failure determination unit 44 determines a failure in the radar device 100 on the basis of the values detected by the detection unit 43. The failure determination threshold table 44a is used for the failure determination of the radar device 100.

Figure 3:
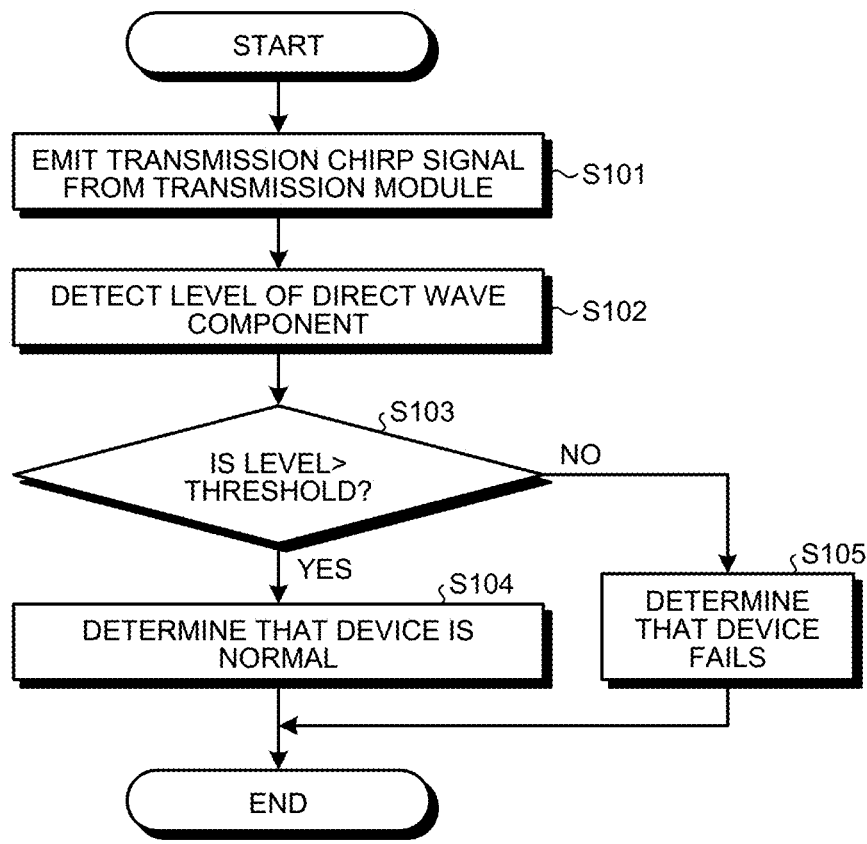
FIG. 3 is a flowchart illustrating an operation process of failure determination in the first embodiment.
Figure 4:
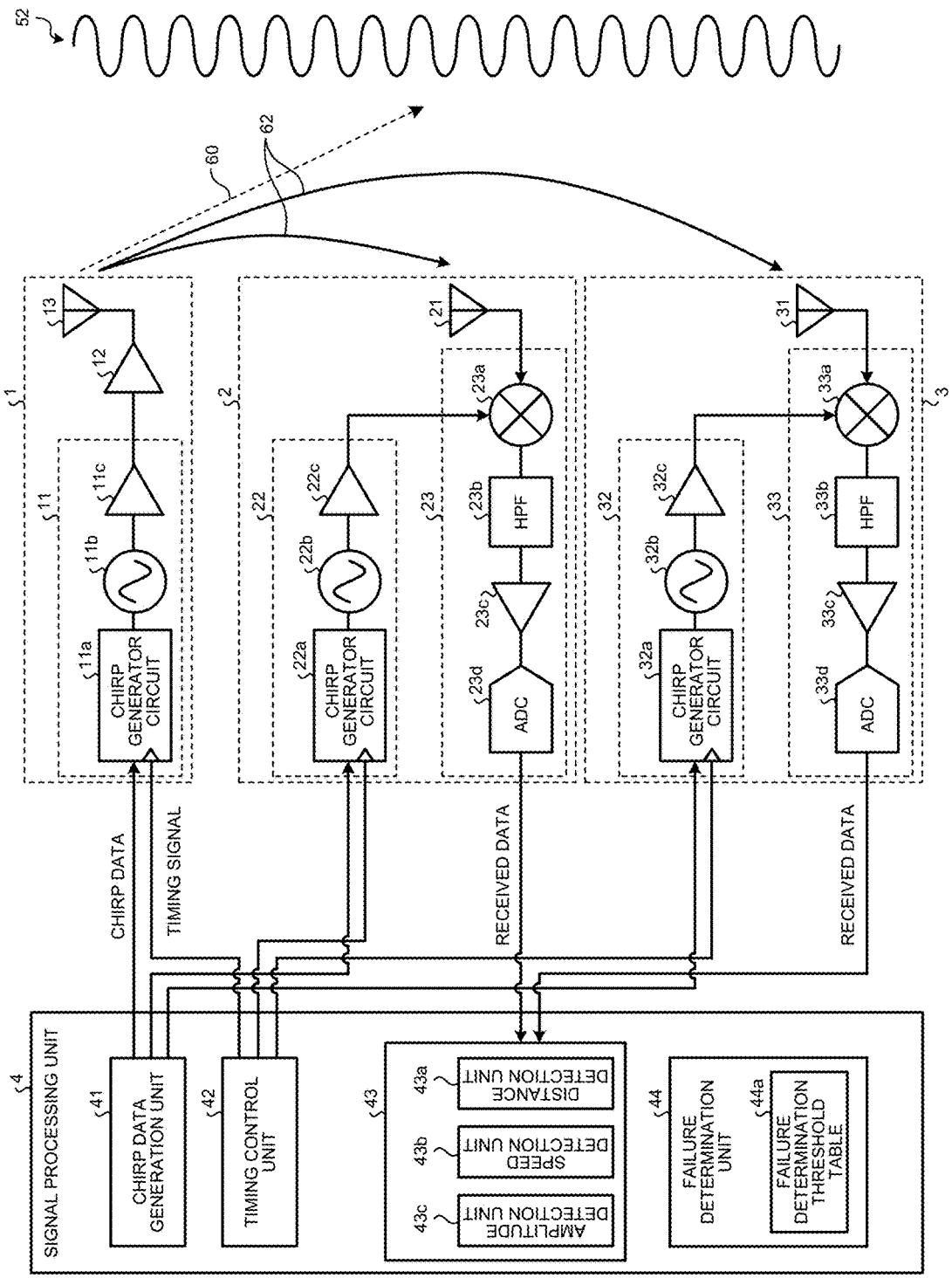
FIG. 4 is a diagram for explaining a measurement environment at the time a failure determination threshold table is prepared (at the time of shipping inspection) in the first embodiment.
Figure 5:
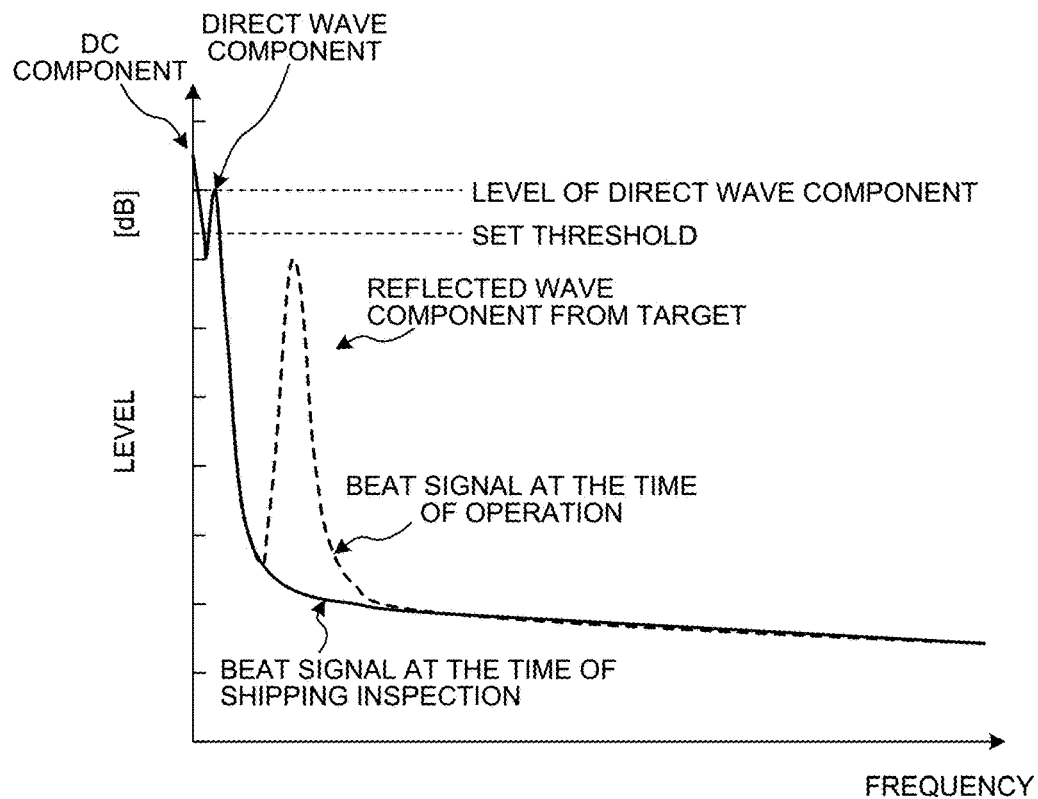
FIG. 5 is a first graph provided for explaining the principle of failure determination in the first embodiment.
Figure 6:
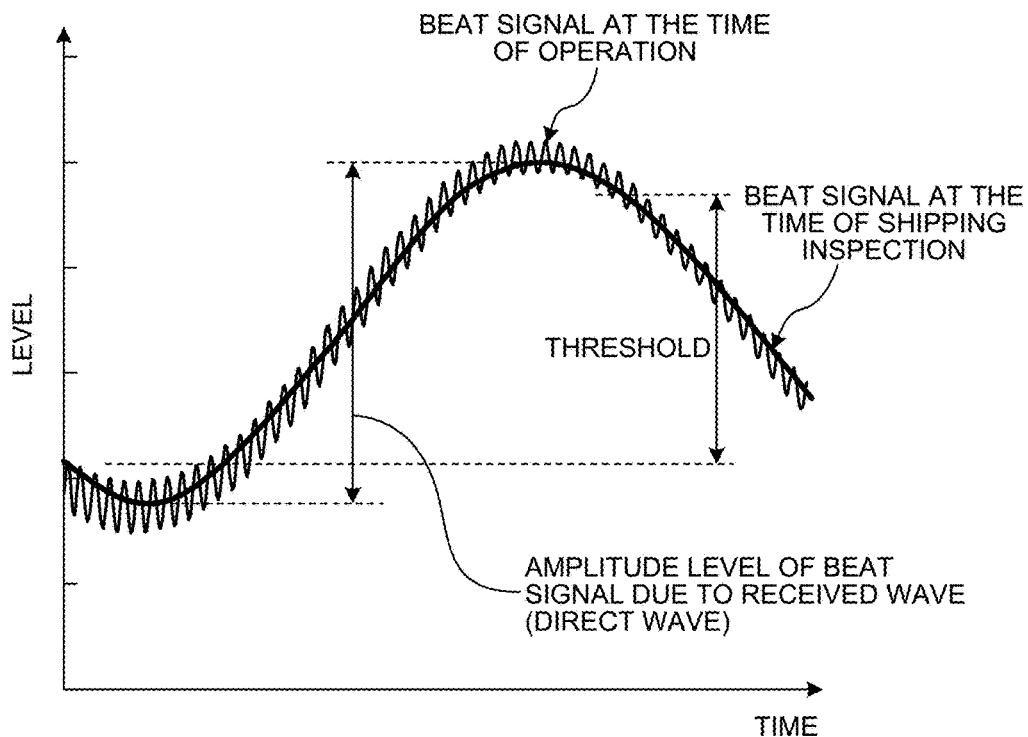
FIG. 6 is a second graph provided for explaining the principle of failure determination in the first embodiment.

Next, a method and a principle of the failure determination in the radar device 100 according to the first embodiment will be described with reference to FIGS. 1 to 7. FIG. 3 is a flowchart illustrating an operation process of the failure determination in the first embodiment. FIG. 4 is a diagram for explaining a measurement environment at the time the failure determination threshold table 44a is prepared (at the time of shipping inspection) in the first embodiment. FIG. 5 is a first graph provided for explaining the principle of the failure determination in the first embodiment. FIG. 6 is a second graph provided for explaining the principle of the failure determination in the first embodiment. FIG. 7 is a table illustrating an example of a threshold table used for the failure determination in the first embodiment.

The first embodiment determines the presence/absence of a failure in the radar device 100 by comparing the level of a direct wave component described later with a threshold. Specifically, a process illustrated in the flowchart of FIG. 3 is used. The process of FIG. 3 is executed at every predetermined cycle of transmission and reception during operation. Note that the failure determination is performed between one transmission module and one reception module on a per transmission-module basis. A transmission/reception coupling path defined by a combination of one transmission module and one reception module is called a "transmission/reception path" for convenience. Hereinafter, the transmission/reception path defined by a combination of the transmission module 1 and the reception module 2 will be described by way of example.

In FIG. 3, the radar device 100 emits the transmission chirp signal 60 from the transmission module 1 (step S101). Most of the transmission chirp signal 60 is beamed at the target 50, and the reflected wave 64 thereof is received by the reception module 2 via the receiving antenna 21. The direct wave 62, which is a part of the transmission chirp signal 60, is directly received by the reception module 2. The received data output from the reception module 2 is sent to the signal processing unit 4. The signal processing unit 4 detects the level of the direct wave component (step S102). The failure determination unit 44 of the signal processing unit 4 compares the level of the direct wave component with a threshold (step S103). If the level of the direct wave component is higher than the threshold (Yes in step S103), the failure determination unit 44 determines that the radar device 100 is normal (step S104), and ends the process of FIG. 3. On the other hand, if the level of the direct wave component is lower than or equal to the threshold (No in step S103), it is determined that an abnormality exists in the transmission/reception path between the transmission module 1 and the reception module 2, and the radar device 100 determines that a failure has occurred (step S105) and ends the process of FIG. 3.

Note that while the process of FIG. 3 goes to "No" if the level of the direct wave component is equal to the threshold in step S103 above, the process may go to "Yes". That is, if the level of the direct wave component is equal to the threshold, the radar device 100 may be determined as being normal.

The threshold shown in the flowchart of FIG. 3 is set using a measurement in the measurement environment of FIG. 4. FIG. 1 is the diagram illustrating the measurement environment at the time of operation, while FIG. 4 is the diagram illustrating the measurement environment at the time of shipping inspection. In the measurement environment at the time of shipping inspection, as illustrated in FIG. 4, a radio wave absorption band 52 is disposed in front of and around the radar device 100. The purpose for which the radio wave absorption band 52 is disposed in front of the radar device 100 is to eliminate the level of the reflected wave 64 of the transmission chirp signal 60 that attempts to return to the side of the reception modules 2 and 3 from the area in front of and around the radar device. Meanwhile, the direct wave 62 of a predetermined level from the transmission module 1 to each of the reception modules 2 and 3 provides coupling between the modules, or between the antennas. Thus, at the time of shipping inspection, the measurement environment under which the reflected wave 64 received by the receiving antennas 21 and 31 is eliminated is established so that only the direct wave 62 is measured. In addition, the threshold is set through a reception analysis of the direct wave 62. Note that in the following description, the measurement environment of FIG. 4 or one equivalent to that of FIG. 4 may be referred to as a "no reflected wave input state".

In FIG. 5, a solid line indicates a spectrum of the beat signal at the time of shipping inspection, and a broken line indicates a spectrum of the beat signal at the time of operation. In FIG. 5, the horizontal axis represents the frequency, and the vertical axis represents the level of the frequency component. The spectral waveform at the time of operation includes a reflected wave component from the target 50 in addition to the direct wave component. In FIG. 5, a component appearing at the frequency of "0" is a direct current (DC) component, and a component appearing immediately on the right side of the DC component is the direct wave component.

As described above, the reflected wave from the target 50 is eliminated in the no reflected wave input state that is the measurement environment at the time of shipping inspection. The threshold can thus be set easily on the basis of a result of measurement of the level of the direct wave component obtained by extracting only the frequency component of the direct wave 62. Note that in FIG. 5, a broken line indicates an example of the threshold set for the direct wave component.

Note that as illustrated in FIG. 5, the direct wave component and the DC component are close to each other in the frequency domain. Therefore, a function that can separate the direct wave component and the DC component in the frequency domain is required. Note that a method of implementing the function that separates the direct wave component and the DC component in the frequency domain will be described later.

When the threshold illustrated in FIG. 5 is used, the level of the frequency component of the direct wave is detected in step S102 of FIG. 3. Also, in step S103 of FIG. 3, the processing of comparing the level of the frequency component of the direct wave with the threshold is performed.

Although FIG. 5 illustrates an example of setting the threshold on the basis of the level of the frequency component of the direct wave, the threshold may be set on the basis of the level of the amplitude of the direct wave. FIG. 6 illustrates a time waveform of the beat signal at the time of shipping inspection and a time waveform of the beat signal at the time of operation. In FIG. 6, the horizontal axis represents time, and the vertical axis represents the level of the beat signal.

In FIG. 6, a thick solid line indicates the time waveform of the beat signal at the time of shipping inspection, and a thin solid line indicates the time waveform of the beat signal at the time of operation. As illustrated in FIG. 6, the time waveform of the beat signal at the time of operation is a waveform in which the component of the reflected wave from the target 50 is superimposed on a low-frequency undulating component, and the amplitude of the beat signal fluctuates. It is thus difficult to set an accurate threshold, using the beat signal at the time of operation. On the other hand, in the time waveform of the beat signal at the time of shipping inspection, only the low-frequency undulating component due to the direct wave is observed so that an accurate threshold can be set. Note that in FIG. 6, a broken line indicates an example of the threshold being set.

Alternatively, a frequency analysis result obtained by extracting the direct wave component may be restored to the time (amplitude) waveform by inverse Fourier transform or the like, and the waveform can be compared with the threshold.

When the threshold illustrated in FIG. 6 is used, in step S102 of FIG. 3, the amplitude detection unit 43c of the signal processing unit 4 detects the level of the amplitude of the direct wave. Also, in step S103 of FIG. 3, the failure determination unit 44 performs the processing of comparing the level of the amplitude of the direct wave with the threshold.

FIG. 7 illustrates an example of the threshold table in the first embodiment. In the example illustrated in FIG. 7, thresholds corresponding to the amplitude and the frequency are set for a plurality of transmission units (#1, #2, . . . ) and reception units (#11, #12, . . . , #21, #22, . . . ) corresponding to each of the transmission units, and for each ambient temperature at which the radar device 100 operates.

In FIG. 7, "$T_1$" and "$T_2$" indicate the ambient temperatures, "$T_{min}$" is the minimum value of the estimated ambient temperature, and "$T_{max}$" is the maximum value of the estimated ambient temperature. Note that temperature values detected by, for example, a thermistor provided in the radar device, which correspond to actual ambient temperatures, may be set as ambient temperatures in the threshold table and consulted.

The thresholds for the ambient temperatures can be set by measuring thresholds at a plurality of ambient temperatures at the time of shipping inspection described above. Alternatively, the thresholds for the ambient temperatures can also be predicted and set from temperature characteristics of the transmission output and reception gain of the transmission module 1 and the reception modules 2 and 3. The thresholds obtained are stored in the table of FIG. 7.

A threshold between the ambient temperatures $T_1$ and $T_2$ can be interpolated by linear approximation or the like. For example, the threshold at the ambient temperature "T" ($T_1 \leq T \leq T_2$) can be obtained by interpolation calculation using the threshold at the ambient temperature "$T_1$" and the threshold at the ambient temperature "$T_2$". Moreover, the thresholds for the ambient temperatures $T_{min}$ and $T_{max}$ may be measured in an actual environment, or may be obtained by prediction as described above or extrapolation calculation.

According to the first embodiment, during the operation of the radar device, the level of the direct wave from the transmission module to the reception module is detected, and the failure determination is performed by comparing the detected level with the threshold. This enables the failure determination of the radar device during the operation without using the reflected wave.

Second Embodiment

Figure 8:
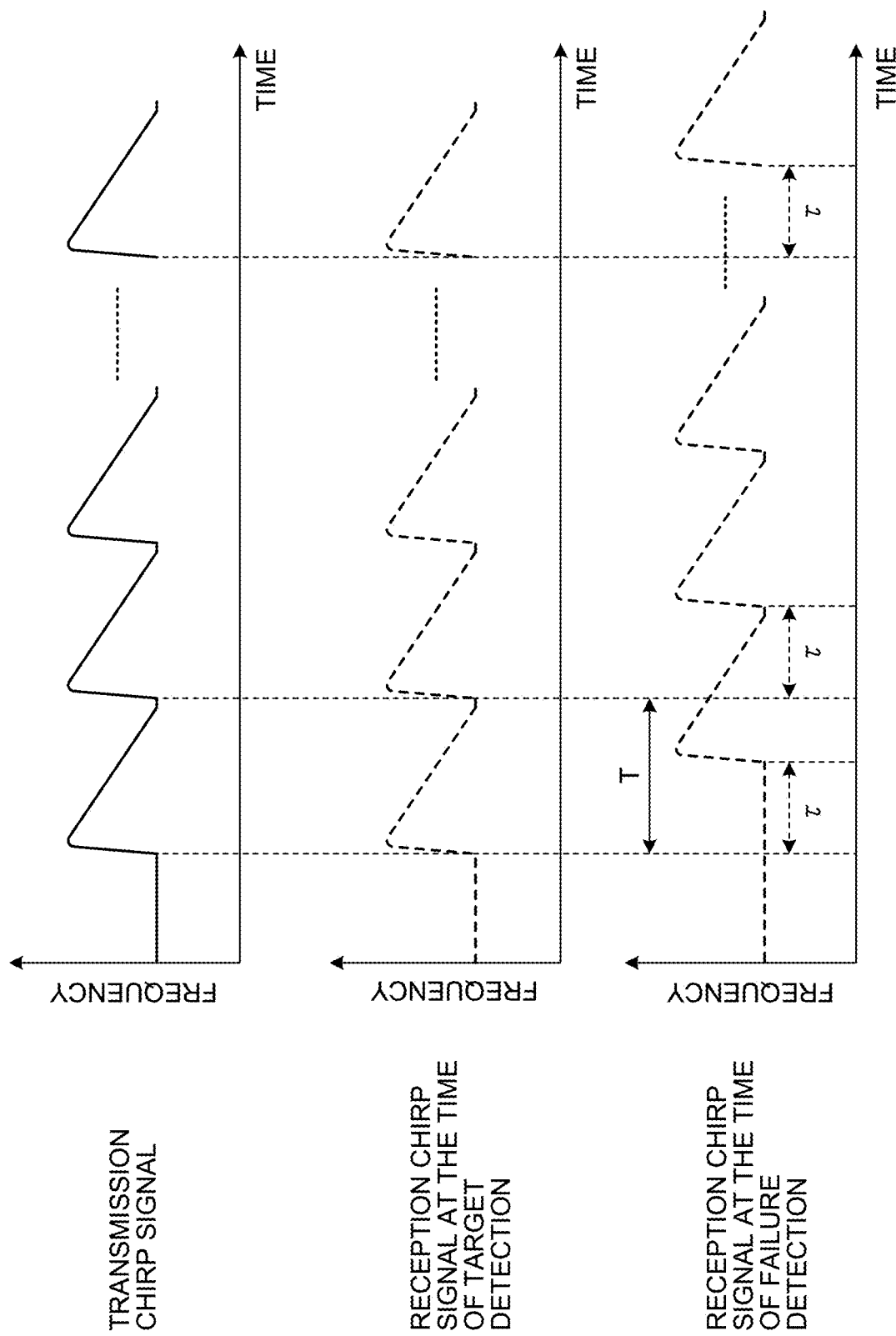
FIG. 8 is a set of timing diagrams illustrating changes in the frequencies of a transmitted chirp signal and a received chirp signal in a second embodiment.
Figure 9:
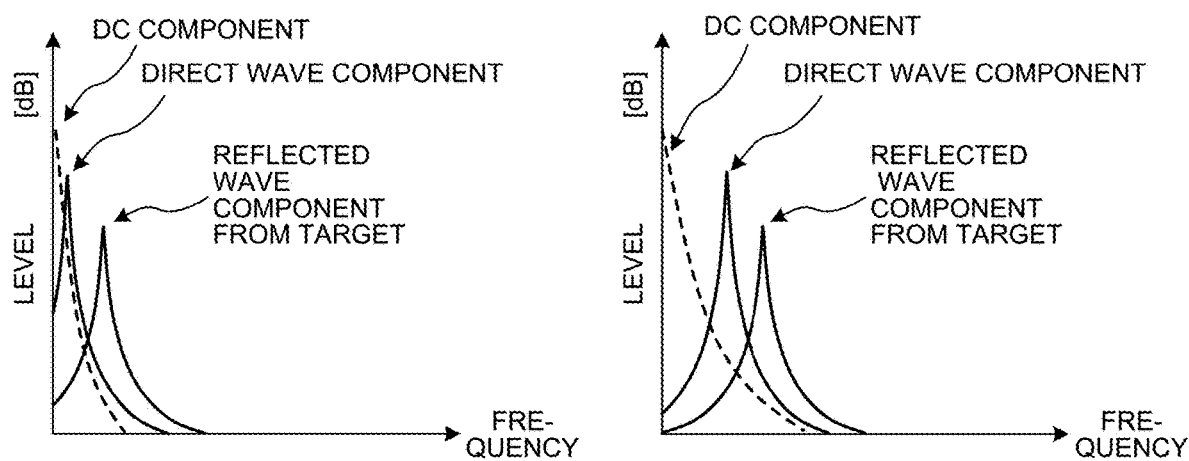
FIG. 9 is a set of graphs provided for explaining an effect of a radar device in the second embodiment.

Next, a radar device according to a second embodiment will be described with reference to FIGS. 8 and 9. FIG. 8 is a set of timing diagrams illustrating changes in the frequencies of a transmission chirp signal and a reception chirp signal in the second embodiment. FIG. 9 is a set of graphs provided for explaining an effect of the radar device in the second embodiment. Note that the functions of the radar device according to the second embodiment can be implemented by a configuration identical or equivalent to that of the first embodiment illustrated in FIG. 1.

In the top diagram of FIG. 8, a solid line indicates a time-frequency waveform of the transmission chirp signal output from the transmission module 1. In the middle diagram of FIG. 8, a broken line indicates a time-frequency waveform of the reception chirp signal output from the RF signal sources 22 and 32 at the time of target detection. In the bottom diagram of FIG. 8, a broken line indicates a time-frequency waveform of the reception chirp signal output from the RF signal sources 22 and 32 at the time of failure detection.

As illustrated in the middle and bottom diagrams of FIG. 8, the waveform of the reception chirp signal in the second embodiment is different between the time of target detection and the time of failure detection. Specifically, the output timing of the reception chirp signal at the time of failure detection is shifted so as to be delayed by time T with respect to the reception chirp signal at the time of target detection. This shift of the output timing is controlled by the timing control unit 42 of the signal processing unit 4. Note that the output timing of the reception chirp signal at the time of target detection matches the output timing of the transmission chirp signal. Therefore, the reception chirp signal at the time of failure detection is delayed by the time τ also with respect to the transmission chirp signal.

The left side of FIG. 9 illustrates a spectrum of the received signal when the output timing of the reception chirp signal is the same as that of the transmission chirp signal. Also, the right side of FIG. 9 illustrates a spectrum of the received signal when the output timing of the reception chirp signal is shifted from that of the transmission signal. In these graphs, solid lines indicate the direct wave component and the reflected wave component from the target 50, and broken lines indicate the DC component, the lines being illustrated in a simulated manner.

As illustrated in FIG. 9, the direct wave component is a low frequency component close to the DC component, and it is therefore difficult to separate the two in terms of frequency. On the other hand, when the output timing of the reception chirp signal is shifted from that of the transmission chirp signal as in the second embodiment, the frequency of the direct wave component increases. This as a result makes the frequency separation relatively easy, and thus can obtain an effect of improving the accuracy of failure detection.

Third Embodiment

Figure 10:
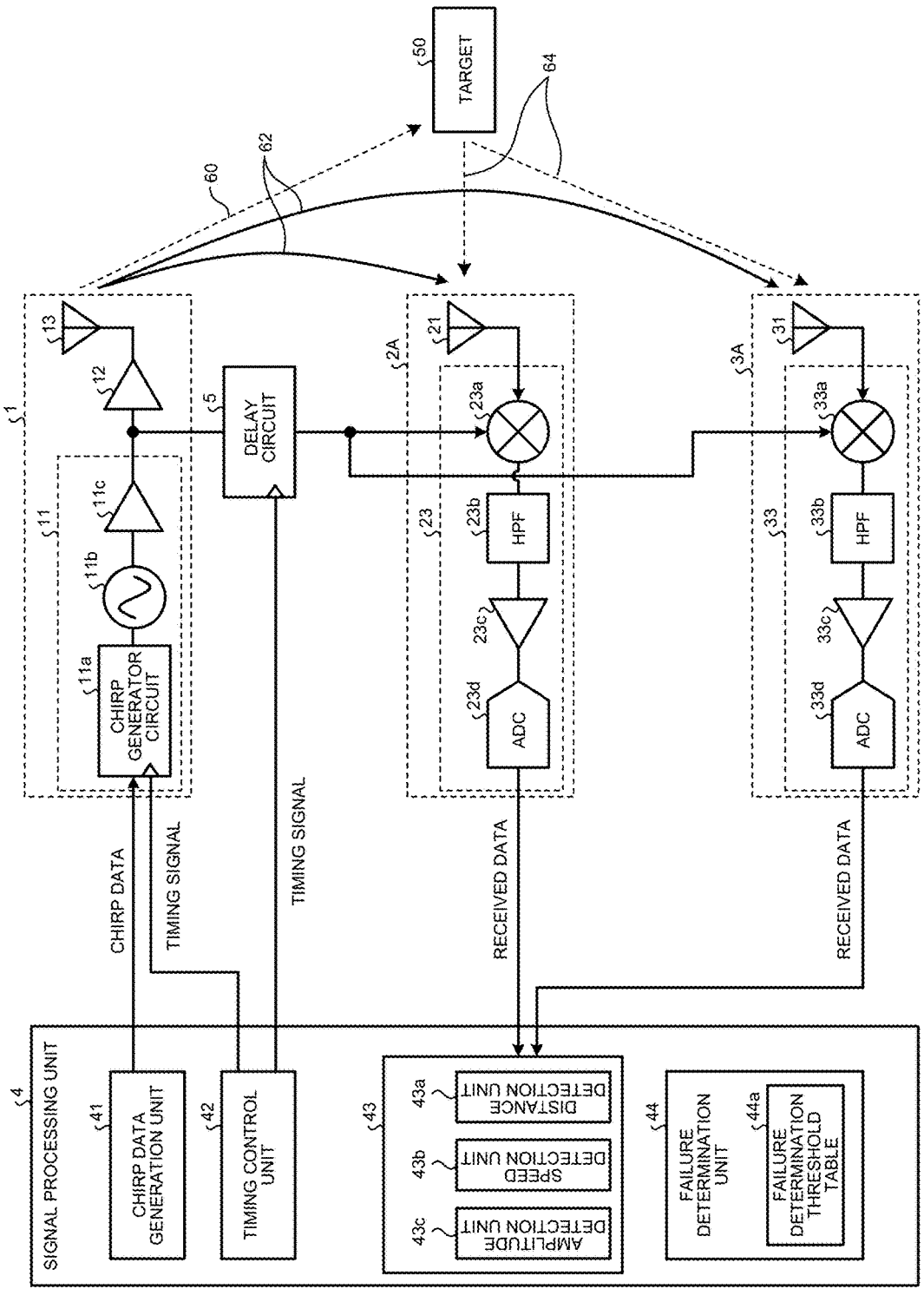
FIG. 10 is a block diagram illustrating a configuration of a radar device according to a third embodiment.

Next, a radar device according to a third embodiment will be described with reference to FIG. 10. FIG. 10 is a block diagram illustrating a configuration of a radar device according to the third embodiment. The radar device 100 according to the first embodiment has the configuration in which each reception module includes the signal source generating the reception chirp signal, whereas a radar device 100A according to the third embodiment has a configuration in which a transmission chirp signal distributed from the transmission module is used as a reception chirp signal.

The radar device 100A according to the third embodiment illustrated in FIG. 10 differs from the configuration of the first embodiment illustrated in FIG. 1 in that reception modules 2A and 3A replace the reception modules 2 and 3, respectively, and a delay circuit 5 is provided between the transmission module 1 and the reception modules 2A and 3A. In the reception module 2A, the RF signal source 22 is omitted, and the output of the delay circuit 5 is input as the reception chirp signal to the mixer 23a. In the reception module 3A, the RF signal source 32 is omitted, and the output of the delay circuit 5 is input as the reception chirp signal to the mixer 33a. Note that the other configurations are identical or equivalent to those of the first embodiment and are thus denoted by the same reference numerals as those in the first embodiment, whereby a description of the overlapping configurations will be omitted.

In the configuration of the third embodiment, the delay time of the delay circuit 5 is controlled by the timing control unit 42 of the signal processing unit 4. A timing signal output from the timing control unit 42 to the delay circuit 5 provides the transmission chirp signal with the delay time τ as illustrated in the bottom diagram of FIG. 8, thereby obtaining the reception chirp signal for failure detection. Needless to say, the transmission time due to the electrical wiring between the transmission module 1 and the reception modules 2A and 3A is taken into consideration in providing the delay time T for the transmission chirp signal.

There exists the transmission time due to the electrical wiring between the transmission module 1 and the reception modules 2A and 3A. Thus, the timing control unit 42 to each of the chirp generator circuit 11a and the delay circuit 5 outputs the timing signal at a timing that takes the transmission time due to the electrical wiring into consideration. This allows the signal output from the delay circuit 5 to be synchronized with the transmission chirp signal as illustrated in the top and middle diagrams of FIG. 8, so that the output of the delay circuit 5 can be used as the reception chirp signal for target detection.

Note that when the value of the transmission time due to the electrical wiring between the transmission module 1 and the reception modules 2A and 3A is so small that the transmission time does not need to be taken into consideration, the function of the delay circuit 5 may be enabled or disabled by the control signal from the timing control unit 42. For example, when the function of the delay circuit 5 is enabled by the control signal from the timing control unit 42, the signal output from the delay circuit 5 can be used as the reception chirp signal for failure detection as illustrated in the bottom diagram of FIG. 8. When the function of the delay circuit 5 is disabled, the signal output from the delay circuit 5 can be used as the reception chirp signal for target detection as illustrated in the middle diagram of FIG. 8.

According to the configuration of the third embodiment, the function equivalent to that of the first embodiment can be achieved without providing the reception module with the signal source that generates the reception chirp signal. This can simplify the configuration and reduce the manufacturing cost. Moreover, the reduction in the number of parts can improve the reliability of the device.

Fourth Embodiment

Figure 11:
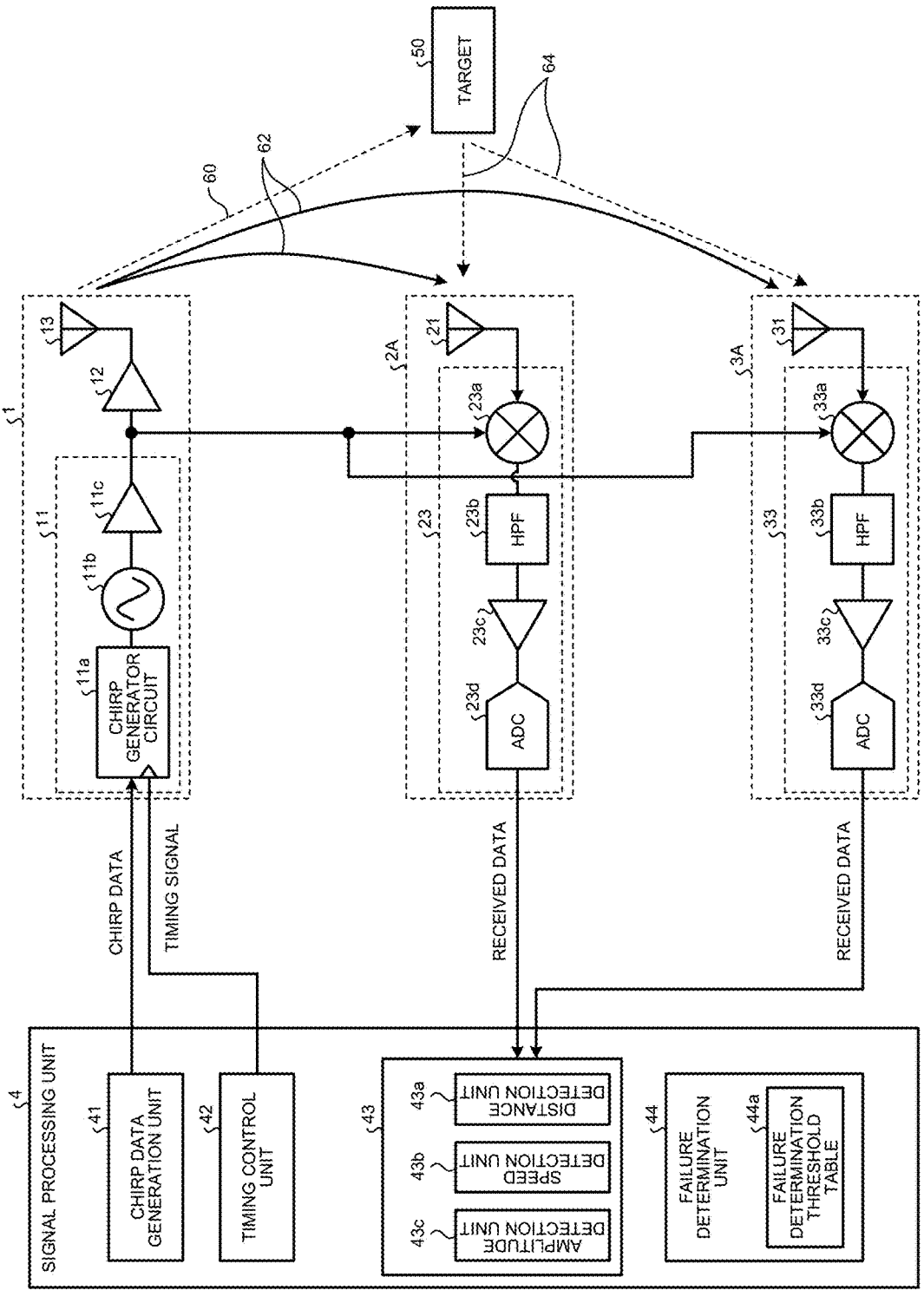
FIG. 11 is a block diagram illustrating a configuration of a radar device according to a fourth embodiment.

Next, a radar device according to a fourth embodiment will be described with reference to FIG. 11. FIG. 11 is a block diagram illustrating a configuration of a radar device 100B according to the fourth embodiment. In the third embodiment, the delay circuit 5 is provided between the transmission module 1 and the reception modules 2A and 3A as illustrated in FIG. 10 to set a time difference between the transmission chirp signal and the reception chirp signal. On the other hand, when a time difference need not be set between the transmission chirp signal and the reception chirp signal as in the first embodiment, a configuration without the delay circuit 5 can be adopted as illustrated in FIG. 11. The configuration of the fourth embodiment can also obtain an effect similar to that of the first embodiment.

Note that FIG. 11 illustrates the configuration in which the transmission chirp signal is distributed from the one transmission module 1 to the two reception modules 2A and 3A, but the configuration is also applicable to a case where a plurality of the transmission modules 1 is provided. In the case where a plurality of the transmission modules 1 is provided, the transmission chirp signal may be distributed from each of the plurality of the transmission modules 1 to a plurality of corresponding reception modules 2. Alternatively, the transmission chirp signal may be distributed from one of the plurality of the transmission modules 1 to each of all the reception modules 2. Yet alternatively, when the number of the transmission modules 1 is "N" ("N" is an integer of 2 or more), the transmission chirp signal may be distributed from "N−M" ("M" is an integer of "N−1" or less) of the transmission modules 1 to each of a plurality of corresponding reception modules 2. Note that this concept is also applicable to the radar device of the third embodiment.

Fifth Embodiment

Figure 12:
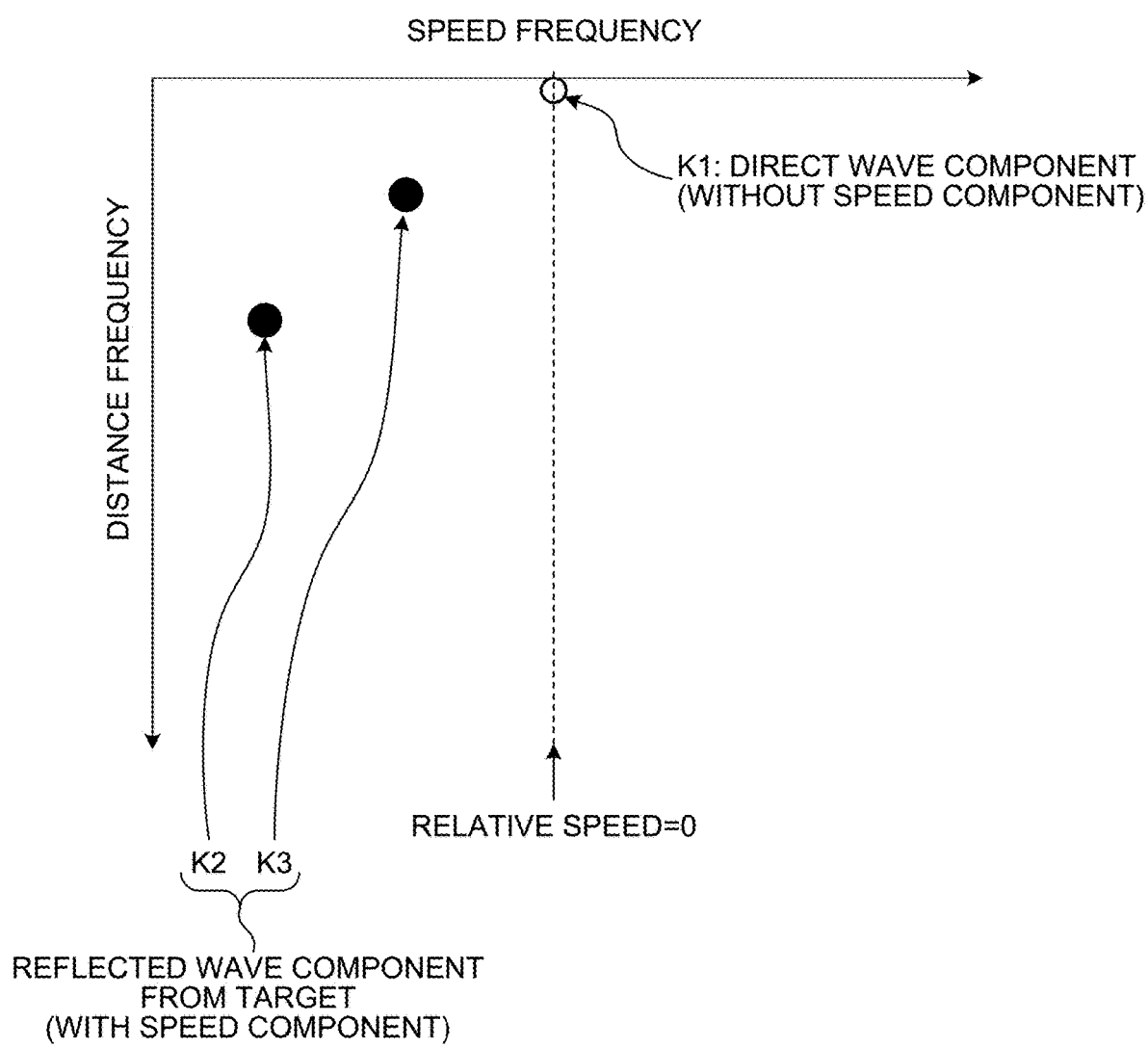
FIG. 12 is a first graph provided for explaining the principle of failure determination in a fifth embodiment.
Figure 13:
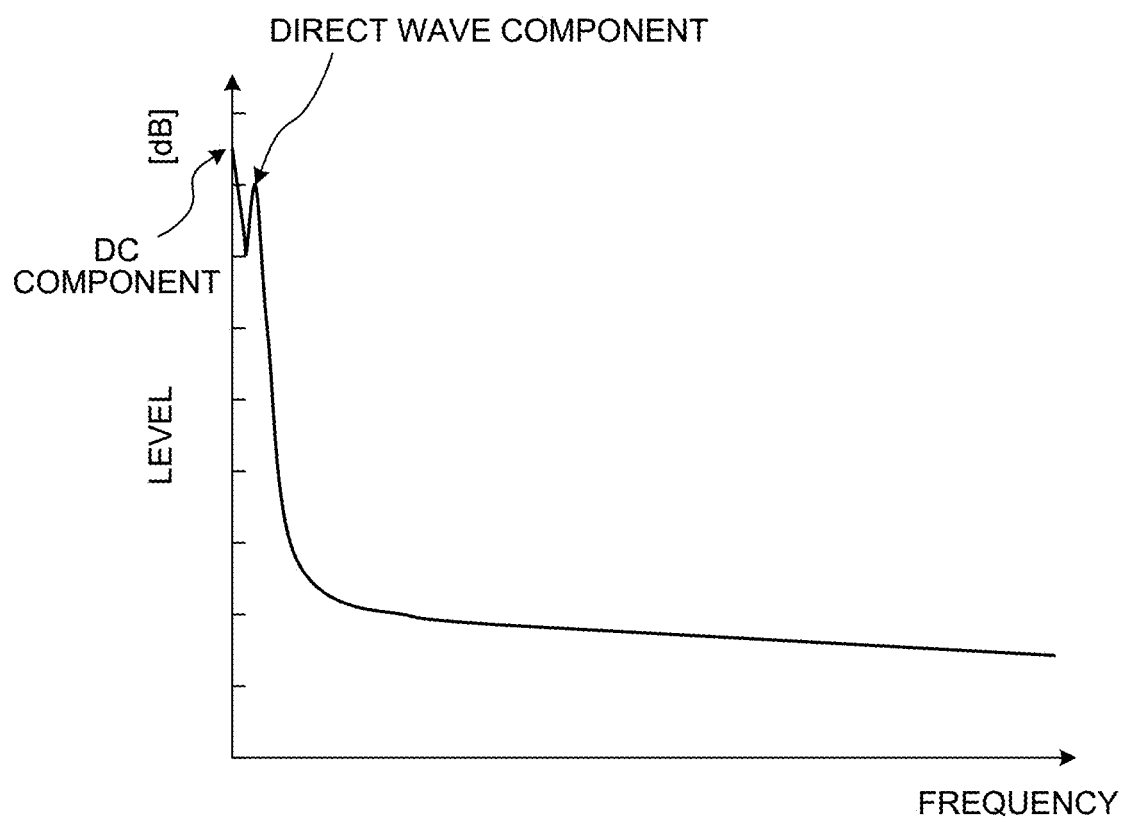
FIG. 13 is a second graph provided for explaining the principle of failure determination in the fifth embodiment.

Next, a radar device according to a fifth embodiment will be described with reference to FIGS. 12 and 13. FIG. 12 is a first graph provided for explaining the principle of failure determination in the fifth embodiment. FIG. 13 is a second graph provided for explaining the principle of failure determination in the fifth embodiment. Note that the functions of the radar device according to the fifth embodiment can be implemented by the configuration in any of FIGS. 1, 10, and 11.

FIG. 12 illustrates a distance-speed map created on the basis of detection results obtained by the distance detection unit 43a and the speed detection unit 43b of the signal processing unit 4. In the distance-speed map, the horizontal axis represents a speed frequency, and the vertical axis represents a distance frequency. Note that although not illustrated in FIG. 12, the intensity of each received signal is typically represented in a z-axis direction corresponding to a direction perpendicular to the surface of paper on which the figure is drawn. In FIG. 12, a part K1 indicated by an arrow represents the direct wave component having no speed component. Also, parts K2 and K3 indicated by arrows represent the reflected wave components from the target 50 having speed components.

FIG. 13 illustrates an analysis result of fast Fourier transform (FFT) in the direction of the distance frequency axis at the relative speed=0 in the distance-speed map illustrated in FIG. 12. In FIG. 13, the DC component and the direct wave component are extracted, but the reflected wave component from the target does not appear. The reason why the reflected wave component from the target does not appear is that only the component at the relative speed=0 is extracted.

Once the analysis result illustrated in FIG. 13 is obtained, the level of the direct wave component obtained is compared with the threshold as in the first embodiment. If the level of the direct wave component obtained is higher than the threshold, the radar device is determined as being normal. If the level of the direct wave component obtained is lower than or equal to the threshold, the radar device is determined as failing.

According to the fifth embodiment, the reflected wave component from a target having a relative speed with respect to the radar device is mainly separated even when the radar device is in operation, whereby the direct wave component from the transmission module to the reception module can be detected. This can obtain the direct wave component not affected by the reflected wave components from a plurality of targets around the radar device, so that the accuracy of failure determination in the radar device can be improved.

Sixth Embodiment

Figure 14:
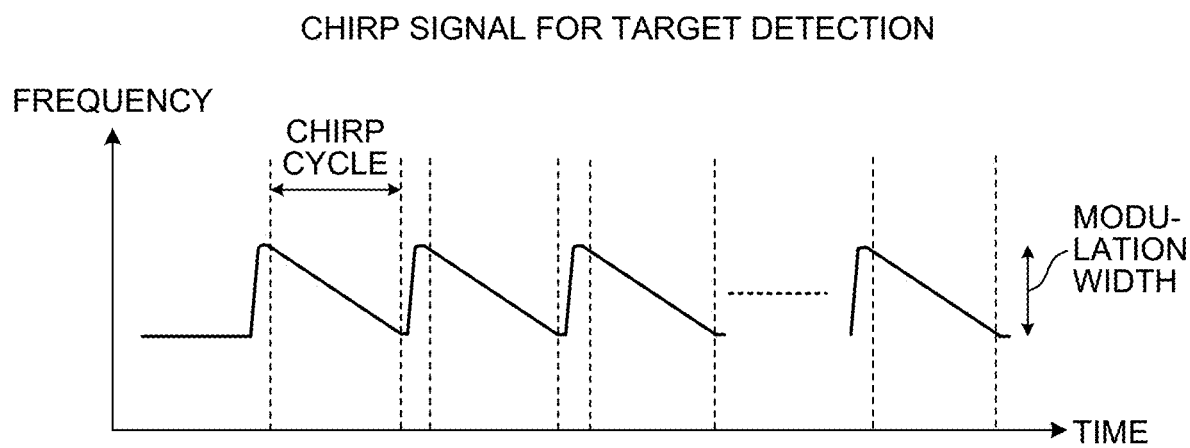
FIG. 14 is a timing diagram illustrating a change in the frequency of a chirp signal for target detection in a sixth embodiment.
Figure 15:
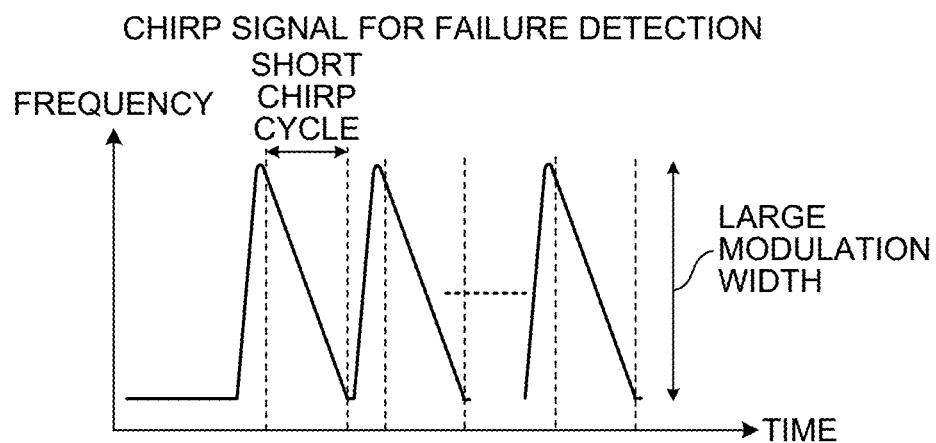
FIG. 15 is a timing diagram illustrating a change in the frequency of a chirp signal for failure detection in the sixth embodiment.
Figure 16:
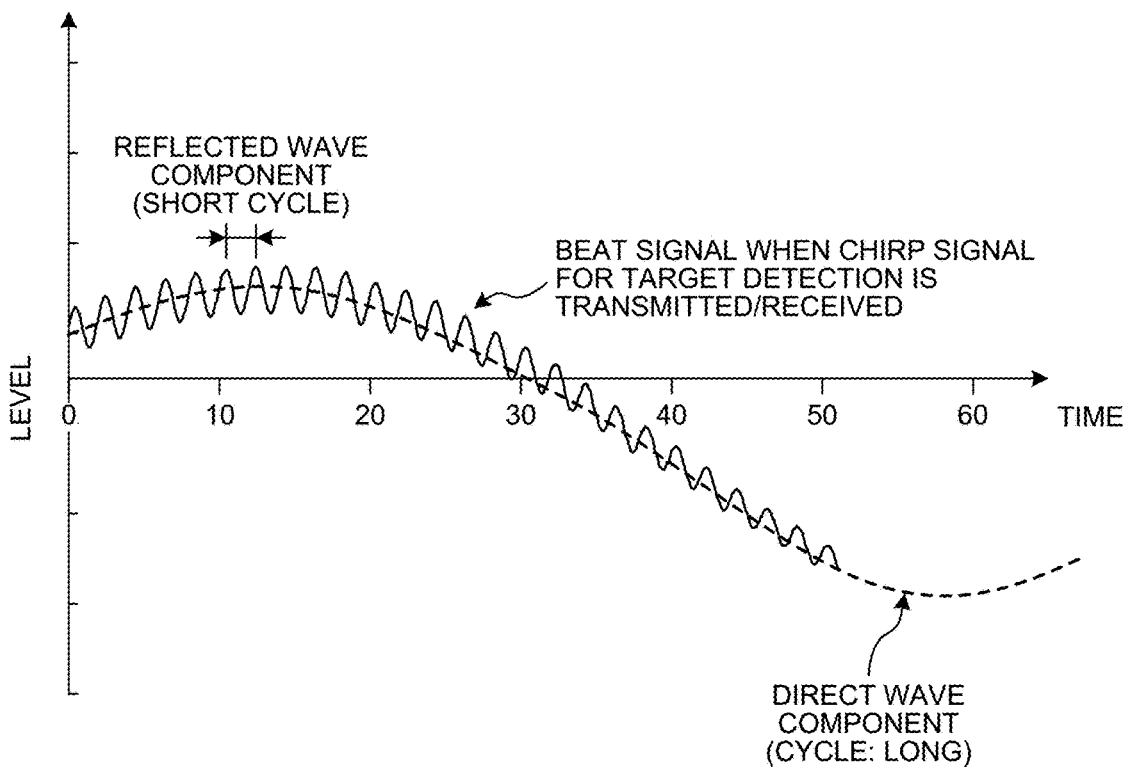
FIG. 16 is a graph illustrating a time waveform of a beat signal when the chirp signal for target detection is transmitted/received in the sixth embodiment.
Figure 17:
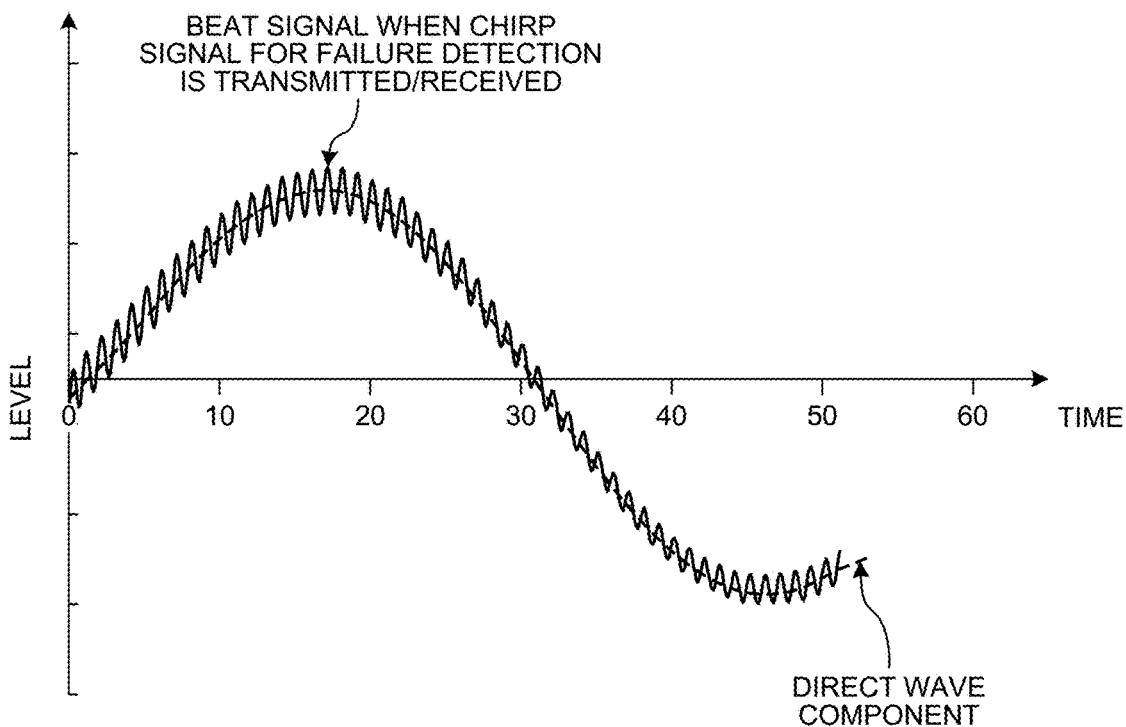
FIG. 17 is a graph illustrating a time waveform of a beat signal when the chirp signal for failure detection is transmitted/received in the sixth embodiment.

Next, a radar device according to a sixth embodiment will be described with reference to FIGS. 14 to 17. FIG. 14 is a timing diagram illustrating a change in the frequency of a chirp signal for target detection in the sixth embodiment. FIG. 15 is a timing diagram illustrating a change in the frequency of a chirp signal for failure detection in the sixth embodiment. FIG. 16 is a graph illustrating a time waveform of a beat signal when the chirp signal for target detection is transmitted/received in the sixth embodiment. FIG. 17 is a graph illustrating a time waveform of a beat signal when the chirp signal for failure detection is transmitted/received in the sixth embodiment. Note that the functions of the radar device according to the sixth embodiment can be implemented by the configuration in any of FIGS. 1, 10, and 11.

FIG. 14 illustrates the waveform of the chirp signal for target detection in the sixth embodiment. Also, FIG. 15 illustrates the waveform of the chirp signal for failure detection in the sixth embodiment. Note that the transmitting side and the receiving side use the chirp signal of the same frequency modulated waveform.

In FIGS. 14 and 15, the horizontal axes have the same scale, and the chirp signal for failure detection has the waveform with one chirp cycle being shorter than the waveform of the chirp signal for target detection, and with the frequency modulation width being set larger than the waveform of the chirp signal for target detection. That is, in the sixth embodiment, the chirp signal for failure detection is set such that the slope of the chirp signal is larger than that of the chirp signal for target detection.

FIG. 16 illustrates the time waveform of the beat signal when the chirp signal for target detection is transmitted/received. In FIG. 16, a curve indicated by a solid line illustrates the time waveform of the signal that is received by the receiving antenna and the reception module in actual operation and output as the beat signal, and the time waveform is a combination of the reflected wave from the target and the direct wave coupled from the transmission module or the transmitting antenna. Moreover, a curve indicated by a broken line represents only the direct wave component in a simulated manner. As illustrated in FIG. 16, the direct wave has a low-frequency undulating component and has a longer cycle than the reflected wave from the target.

FIG. 17 illustrates the time waveform of the beat signal when the chirp signal for failure detection is transmitted/received. Note that in FIGS. 16 and 17, the vertical axes and the horizontal axes have the same scales. Although the characteristics of the waveform are the same between the chirp signals, the amplitude of the signal waveform is larger when the chirp signal for failure detection is used. Accordingly, when the chirp signal for failure detection is used, the amplitude of the direct wave is easily distinguished from the amplitude of the reflected wave from the target so that the accuracy of threshold determination can be improved. In addition, the cycle of undulation is shorter when the chirp signal for failure detection is used. This makes it easy to grasp one cycle of the direct wave, so that the failure determination can be reliably performed even in a receiving environment under which there are many reflected waves from targets.

As described above, according to the sixth embodiment, a failure in the radar device is determined by using the chirp signal for failure detection set to have a larger slope than the chirp signal for target detection, whereby the failure determination can be reliably performed with the improved accuracy of the failure determination. Moreover, in the sixth embodiment, the chirp signal for target detection and the chirp signal for failure detection are individually assigned, but the chirp signal for failure detection set to have the large slope may be used for target detection depending upon the operating conditions of the radar device.

Seventh Embodiment

Figure 18:
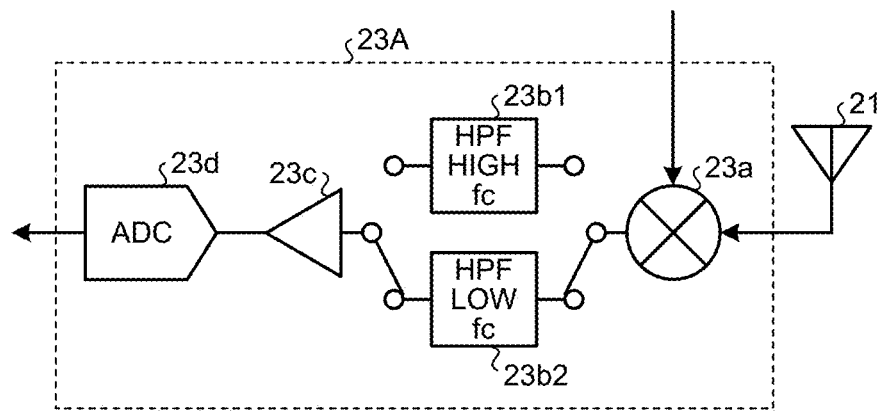
FIG. 18 is a block diagram illustrating a configuration of a main part of a radar device according to a seventh embodiment.
Figure 19:
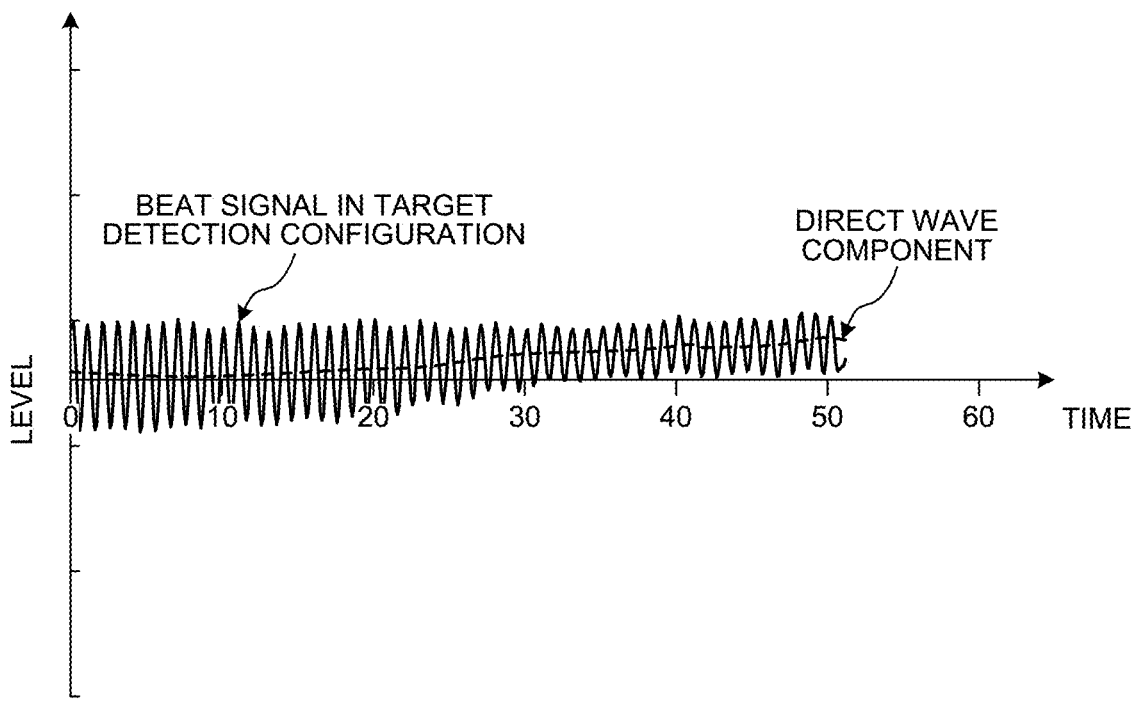
FIG. 19 is a graph illustrating a time waveform of a beat signal in a configuration for target detection in the seventh embodiment.
Figure 20:
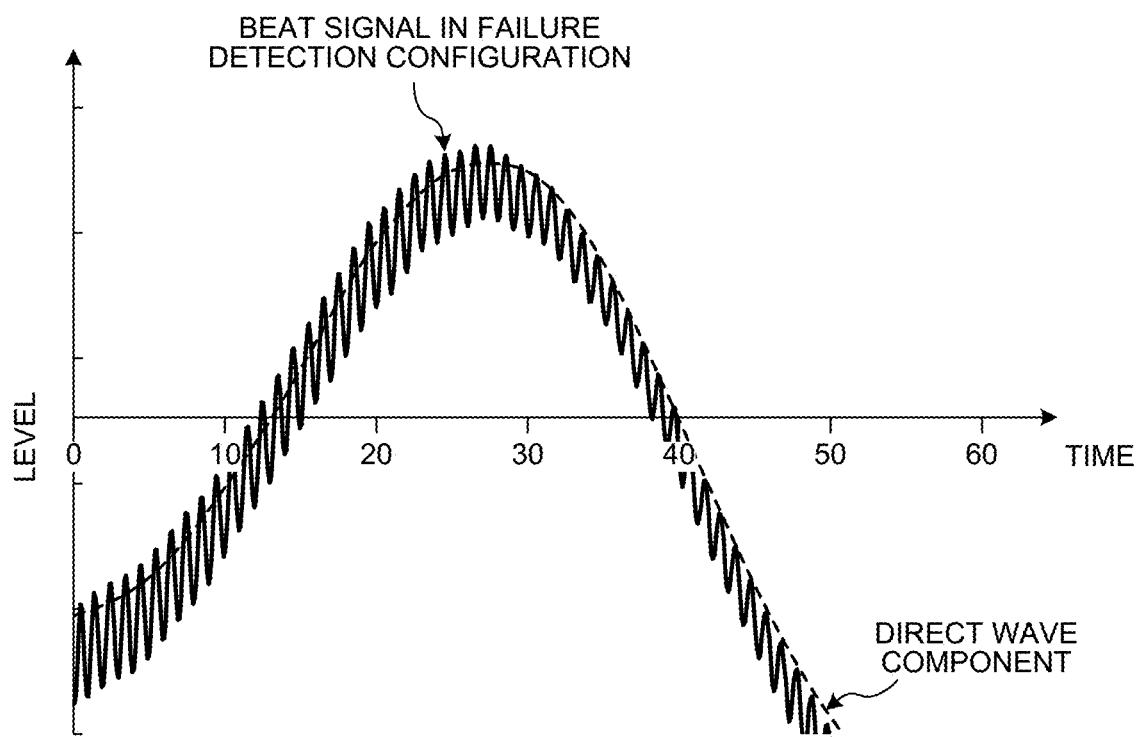
FIG. 20 is a graph illustrating a time waveform of a beat signal in a configuration for failure detection in the seventh embodiment.

Next, a radar device according to a seventh embodiment will be described with reference to FIGS. 18 to 20. FIG. 18 is a block diagram illustrating a configuration of a main part of a reception unit of the radar device according to the seventh embodiment. FIG. 19 is a graph illustrating a time waveform of a beat signal in a configuration for target detection in the seventh embodiment. FIG. 20 is a graph illustrating a time waveform of a beat signal in a configuration for failure detection in the seventh embodiment.

The radar device according to the seventh embodiment is obtained by replacing the reception unit 23 in FIG. 1, 10, or 11 with a reception unit 23A illustrated in FIG. 18. In the reception unit 23A, for example, the HPF 23b in the configuration of the reception unit 23 illustrated in FIG. 1 is replaced with an HPF 23b1 and an HPF 23b2. The HPF 23b1 is an HPF for target detection, and the HPF 23b2 is an HPF for failure detection. Note that a cut-off frequency fc of the HPF 23b2 for failure detection is set lower than that of the HPF 23b1 for target detection. Thus, in the seventh embodiment, the HPF of the reception unit 23A is switched to the HPF 23b1 having the relatively high cut-off frequency fc at the time of target detection, and is switched to the HPF 23b2 having the relatively low cut-off frequency fc at the time of failure detection.

FIG. 19 illustrates the time waveform of the beat signal when the HPF 23b1 for target detection is used, and FIG. 20 illustrates the time waveform of the beat signal when the HPF 23b2 for failure detection is used. In each of FIGS. 19 and 20, a curve indicated by a broken line represents the direct wave component, and a curve indicated by a solid line represents the waveform of an actual beat signal that is a combined wave of the reflected wave component from the target and the direct wave component.

When the HPF 23b1 for target detection is used, as illustrated in FIG. 19, a low-frequency undulating component representing the direct wave is blocked by the HPF 23b1 and is decreased in level, so that it is difficult to detect the component. Meanwhile, the target is easily detected because the low-frequency undulating component is small. On the other hand, when the HPF 23b2 for failure detection is used, the low-frequency undulating component representing the direct wave is not blocked by the HPF 23b2 and is increased in level. Accordingly, at the time of failure detection, the HPF 23b2 for failure detection is used to detect the level of the beat signal, and the presence or absence of a failure in the radar device can be determined by comparing the detected level with a threshold.

As described above, according to the seventh embodiment, the HPF for target detection and the HPF for failure detection with the cut-off frequency fc being set lower than that of the HPF for target detection are prepared, and, at the time of failure detection, the HPF for failure detection is used to determine a failure in the radar device, so that the failure determination can be reliably performed while preventing a decrease in the accuracy of target detection.

Eighth Embodiment

Figure 21:
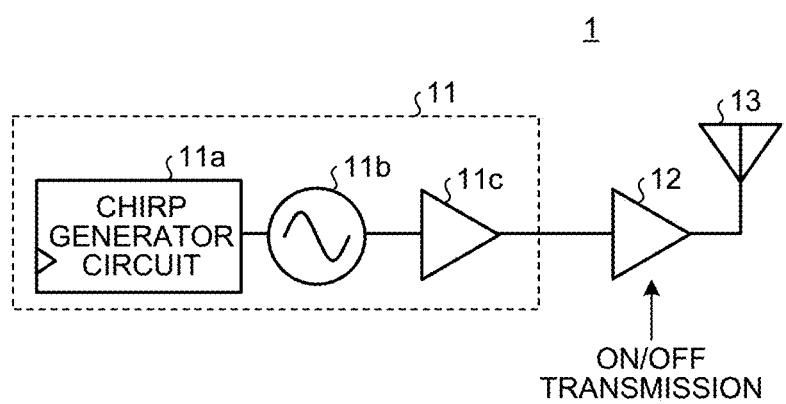
FIG. 21 is a block diagram illustrating a mode of on/off control of a transmission unit of a radar device according to an eighth embodiment.
Figure 22:
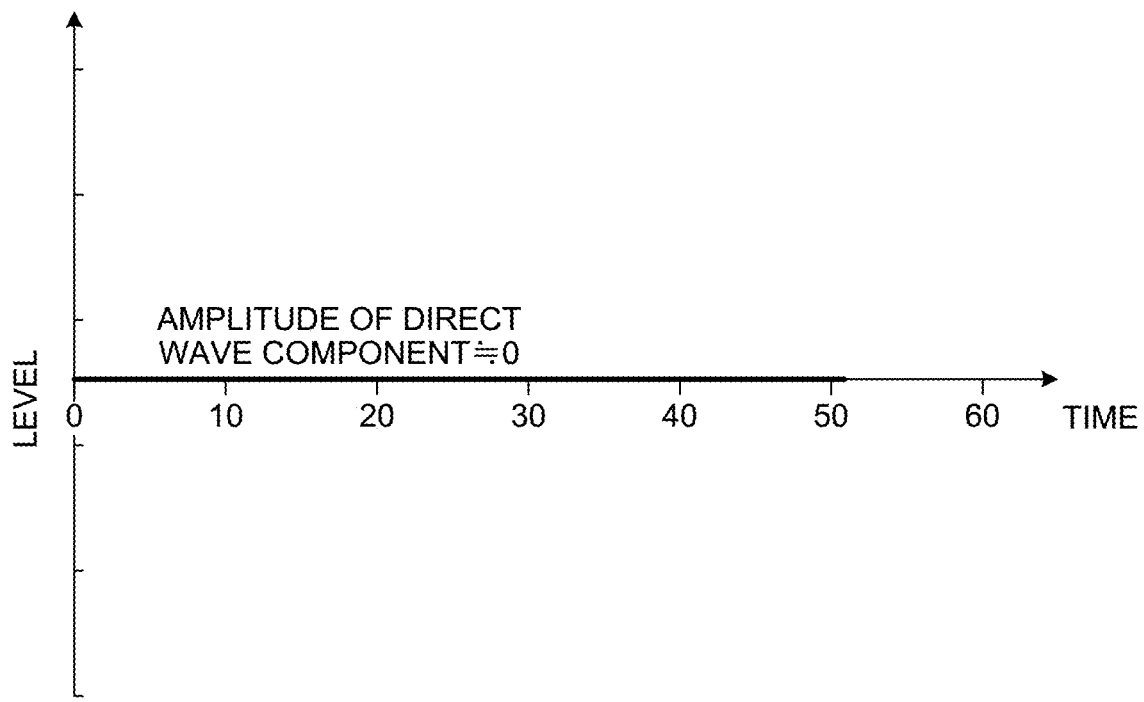
FIG. 22 is a first graph illustrating a time waveform of a direct wave observed by the off control of the transmission unit in the eighth embodiment.
Figure 23:
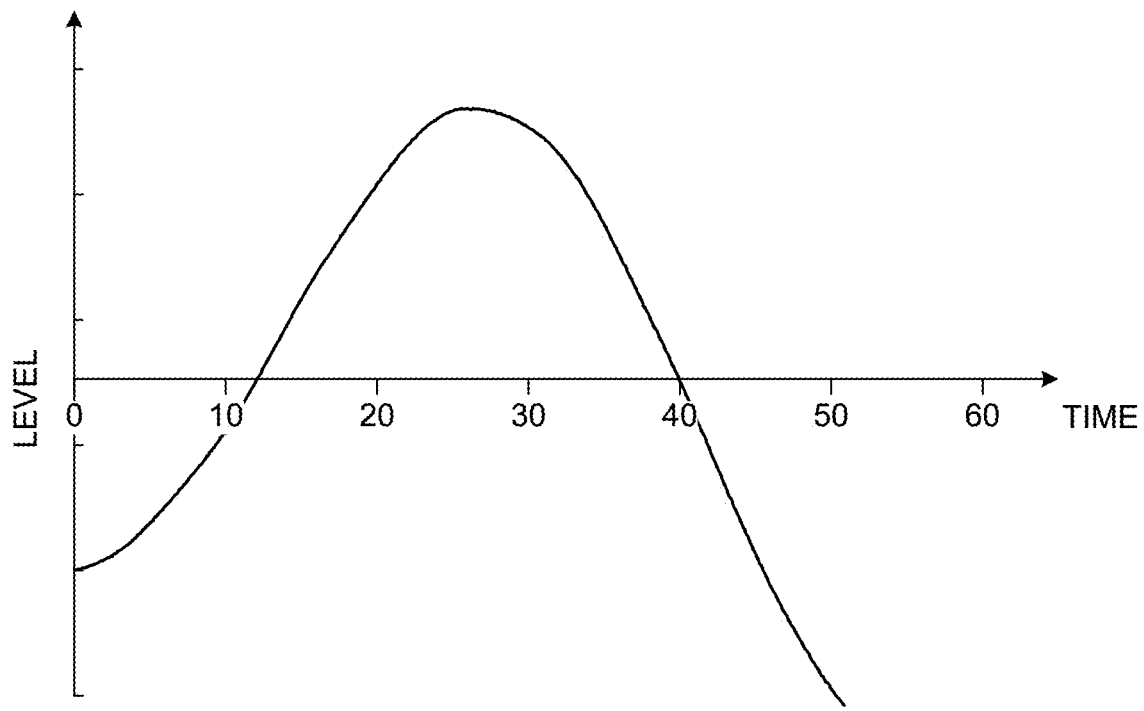
FIG. 23 is a second graph illustrating a time waveform of a direct wave observed by the on control of the transmission unit in the eighth embodiment.

Next, a radar device according to an eighth embodiment will be described with reference to FIGS. 21 to 23. FIG. 21 is a block diagram illustrating a mode of on/off control of the transmission unit of the radar device according to the eighth embodiment. FIG. 22 is a first graph illustrating a time waveform of a direct wave observed by the off control of the transmission unit in the eighth embodiment. FIG. 23 is a second graph illustrating a time waveform of the direct wave observed by the on control of the transmission unit in the eighth embodiment. FIGS. 22 and 23 both illustrate the beat signal in the no reflected wave input state for convenience, and thus the reflected wave from the target is not included in the beat signal. Note that the functions of the radar device according to the eighth embodiment can be implemented by the configuration in any of FIGS. 1, 10, and 11.

In the eighth embodiment, the signal processing unit 4 performs on/off control on the amplifier 12 of the transmission module 1, that is, controls the output of the transmitted chirp signal. FIG. 22 illustrates the time waveform of the beat signal when the amplifier 12 is controlled to be off, and FIG. 23 illustrates the time waveform of the beat signal when the amplifier 12 is controlled to be on. Note that FIGS. 22 and 23 both illustrate the waveform of the beat signal in the no reflected wave input state, that is, the waveform of the direct wave.

When the amplifier 12 is controlled to be off, the transmission chirp signal is not emitted from the transmission module 1, so that the amplitude of the direct wave component of the beat signal is almost zero as illustrated in FIG. 22, and the direct wave component is not observed. On the other hand, when the amplifier 12 is controlled to be on, the transmission chirp signal is emitted from the transmission module 1 unless the radar device fails. At this time, the beat signal of the direct wave traveling from the transmission module 1 to the reception module has a large amplitude value as illustrated in FIG. 23. On the other hand, when the radar device fails, a predetermined decrease in the level from the amplitude value illustrated in FIG. 23 is observed.

Accordingly, in the eighth embodiment, a difference between the amplitude value of the direct wave component of the beat signal when the amplifier 12 is controlled to be on and the amplitude value of the direct wave component of the beat signal when the amplifier 12 is controlled to be off is defined as a threshold. The similar amplitude difference during actual operation is obtained and compared with the threshold. If the difference is larger than the threshold, the radar device is determined as being normal. On the other hand, if the difference is less than or equal to the threshold, the radar device is determined as failing. Note that the threshold is set on the basis of the measurement result in the no reflected wave input state, as in the first embodiment.

According to the eighth embodiment, the difference between the amplitude value of the direct wave component of the beat signal when the transmitted chirp signal is emitted and the amplitude value of the direct wave component of the beat signal when the transmitted chirp signal is not emitted is defined as the threshold. The similar amplitude difference during the actual operation is obtained compared with the threshold, so that the presence or absence of a failure in the radar device is determined. As a result, the failure determination of the radar device can be performed more accurately.

Note that although the signal waveform in the no reflected wave input state is illustrated in the above description, the failure determination of the radar device can be performed by a similar method even at the time of operation in the presence of the reflected wave from the target.

Ninth Embodiment

Figure 24:
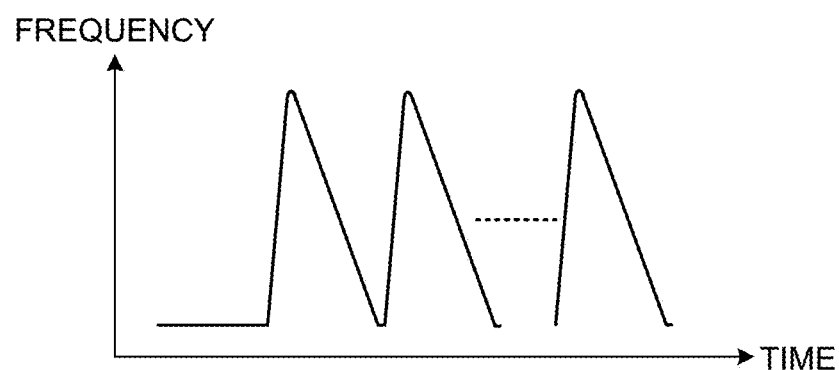
FIG. 24 is a timing diagram illustrating a change in the frequency of a chirp signal for failure detection (modulated signal) in a ninth embodiment.
Figure 25:
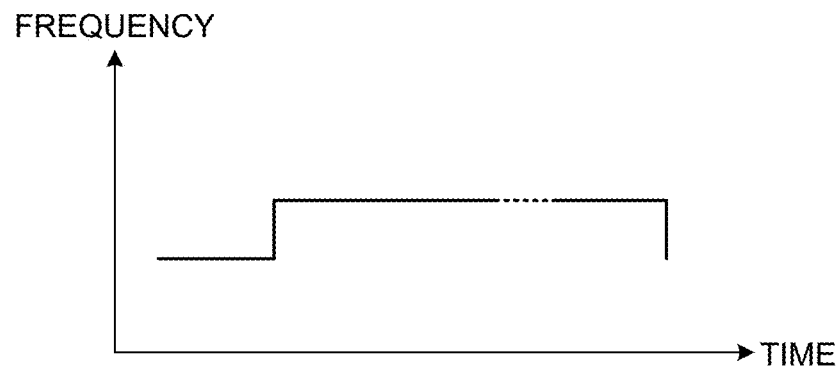
FIG. 25 is a timing diagram illustrating a change in the frequency of the chirp signal for failure detection (unmodulated signal) in the ninth embodiment.
Figure 26:
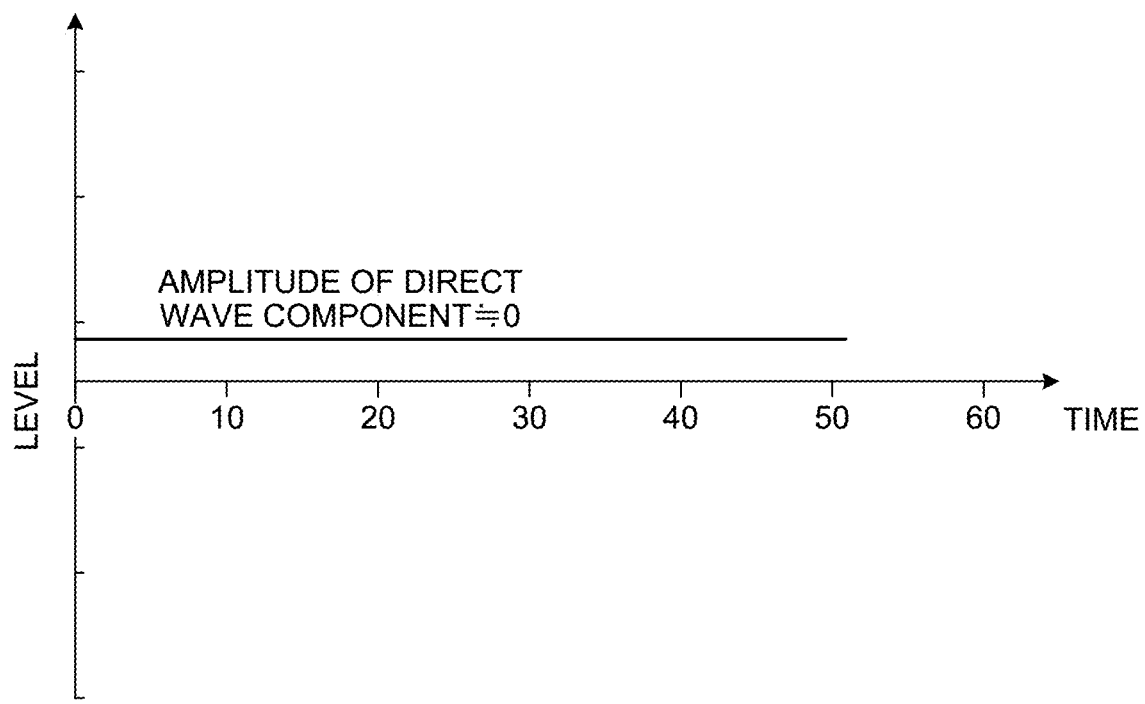
FIG. 26 is a graph illustrating a time waveform of a direct wave observed by the unmodulated signal illustrated in FIG. 25.
Figure 27:
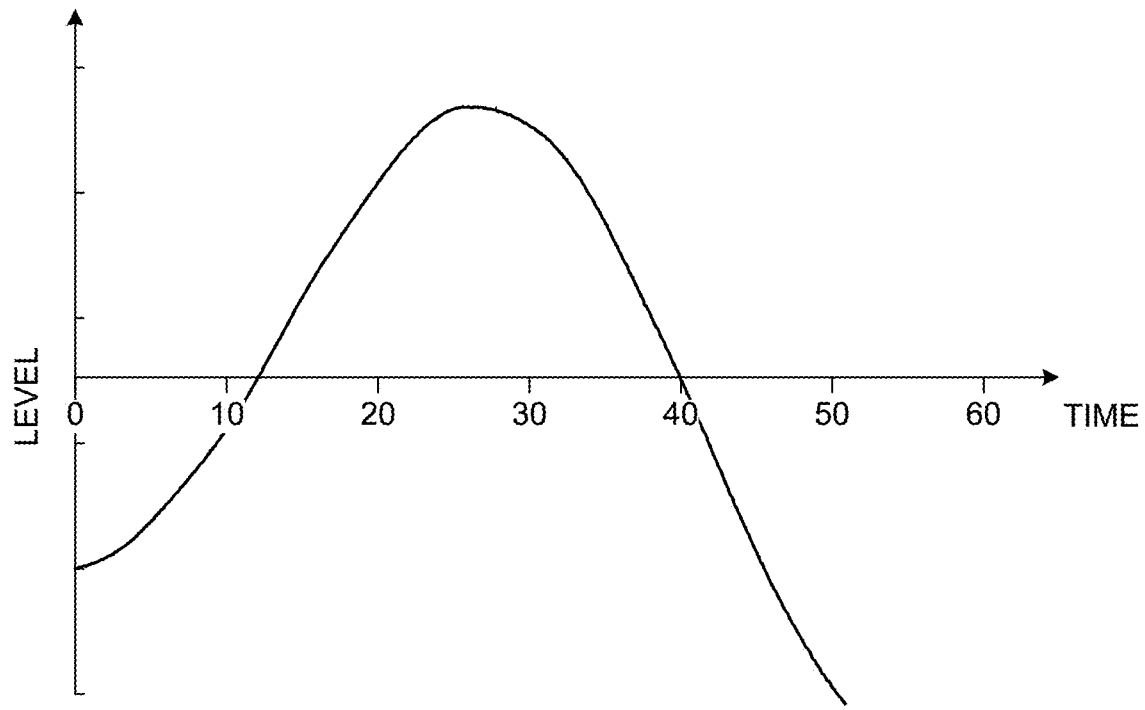
FIG. 27 is a graph illustrating a time waveform of a direct wave observed by the modulated signal illustrated in FIG. 24.

Next, a radar device according to a ninth embodiment will be described with reference to FIGS. 24 to 27. FIGS. 24 and 25 are timing diagrams each illustrating a change in the frequency of the chirp signal for failure detection (modulated signal) in the ninth embodiment. FIG. 24 illustrates a chirp signal at the time of modulation (a modulated chirp signal) that is one of the chirp signals for failure detection, and FIG. 25 illustrates a signal at the time of no modulation (an unmodulated signal) that is another one of the chirp signals for failure detection. FIG. 26 is a graph illustrating a time waveform of the direct wave observed by the unmodulated signal illustrated in FIG. 25. FIG. 27 is a graph illustrating a time waveform of the direct wave observed by the modulated signal illustrated in FIG. 24. FIGS. 26 and 27 both illustrate the beat signal in the no reflected wave input state for convenience, and thus the reflected wave from the target is not included in the beat signal. Note that the functions of the radar device according to the ninth embodiment can be implemented by the configuration in any of FIGS. 1, 10, and 11.

The chirp signal for failure detection (modulated signal) illustrated in FIG. 24 is the same as that illustrated in FIG. 15. Here, when a state in which the frequency of the chirp signal for failure detection changes with time is defined as a "state of modulation", a state termed "state of no modulation" is defined in the ninth embodiment. In the state of no modulation, as illustrated in FIG. 25, the signal of a specific frequency without frequency modulation is output. In the ninth embodiment, the signal processing unit 4 performs control for switching between the state of no modulation and the state of modulation, that is, control for switching between the unmodulated signal and the modulated chirp signal.

FIG. 26 illustrates the waveform of the beat signal when the unmodulated signal illustrated in FIG. 25 is output. Also, FIG. 27 illustrates the waveform of the beat signal when the modulated chirp signal illustrated in FIG. 24 is output. Note that FIGS. 26 and 27 both illustrate the waveform of the beat signal in the no reflected wave input state. In FIGS. 26 and 27, the vertical axes and the horizontal axes have the same scales.

As described above, at the time of failure detection, the ninth embodiment switches between the state of no modulation in which the unmodulated signal is output and the state of modulation in which the modulated chirp signal subjected to frequency modulation is output. In the state of no modulation, as illustrated in FIG. 26, the amplitude of the low-frequency undulating component of the direct wave in the beat signal is almost zero, and thus the level of the direct wave component in the beat signal is low. On the other hand, in the state of modulation, the modulated chirp signal illustrated in FIG. 24 is emitted from the transmission module 1 unless the radar device fails. At this time, the beat signal of the direct wave traveling from the transmission module 1 to the reception module has a large amplitude value as illustrated in FIG. 27. On the other hand, when the radar device fails, a predetermined decrease in the level from the amplitude value illustrated in FIG. 27 is observed.

Accordingly, in the ninth embodiment, a difference between the amplitude value of the direct wave component of the beat signal when the modulated chirp signal is emitted and the amplitude value of the direct wave component of the beat signal when the unmodulated signal is emitted is defined as a threshold. The similar amplitude difference during the actual operation is obtained and compared with the threshold. If the difference is larger than the threshold, the radar device is determined as being normal. On the other hand, if the difference is less than or equal to the threshold, the radar device is determined as failing. Note that the threshold is set on the basis of the measurement result in the no reflected wave input state, as in the first embodiment.

According to the ninth embodiment, the difference between the amplitude value of the direct wave component of the beat signal in the state of no modulation that is not subjected to frequency modulation and the amplitude value of the direct wave component of the beat signal in the state of modulation that is subjected to frequency modulation is defined as the threshold. The similar amplitude difference during the actual operation is obtained and compared with the threshold, so that the presence or absence of a failure in the radar device is determined. As a result, the failure determination of the radar device can be performed more accurately.

Note that although the signal waveform in the no reflected wave input state is illustrated in the above description, the failure determination of the radar device can be performed by a similar method even at the time of operation in the presence of the reflected wave from the target.

Tenth Embodiment

Figure 28:
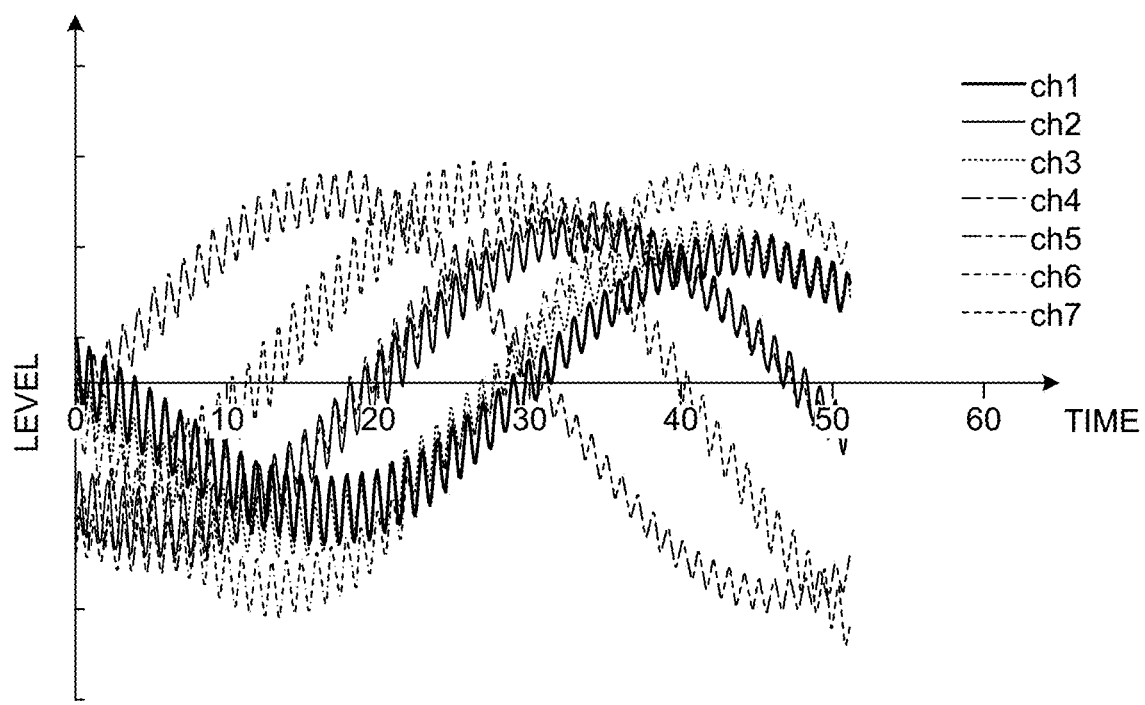
FIG. 28 is a graph illustrating a time waveform of a beat signal in a tenth embodiment.

Next, a radar device according to a tenth embodiment will be described with reference to FIG. 28. FIG. 28 is a graph illustrating a time waveform of the beat signal in the tenth embodiment. The first to ninth embodiments have been described focusing on the beat signal in one reception unit. In the tenth embodiment, the failure determination of the radar device performed on a plurality of reception channels will be described.

FIG. 28 illustrates, by way of example, the waveforms of beat signals in seven transmission/reception paths (ch1 to ch7). One transmission/reception path is formed by a combination of one transmission module and one reception module. Therefore, in the case of providing two transmission modules and six reception modules, for example, twelve transmission/reception paths are formed.

As the scale of the radar device increases, the number of the transmission/reception paths also increases. When the radar device includes a plurality of transmission modules, the failure determination of the radar device is performed by switching the transmission modules. Display of the beat signal can be controlled using any of the methods described in the sixth to ninth embodiments.

According to the tenth embodiment, the failure determination is performed on the plurality of transmission/reception paths to determine which transmission/reception path has an abnormality, thereby identifying which transmission/reception module fails. Moreover, when a combination of a plurality of failure results of the transmission/reception paths demonstrates that the failure depends on a specific transmission module or reception module, it is possible to further identify, from the transmission/reception paths, which of the transmission module and the reception module fails.

Eleventh Embodiment

Figure 29:
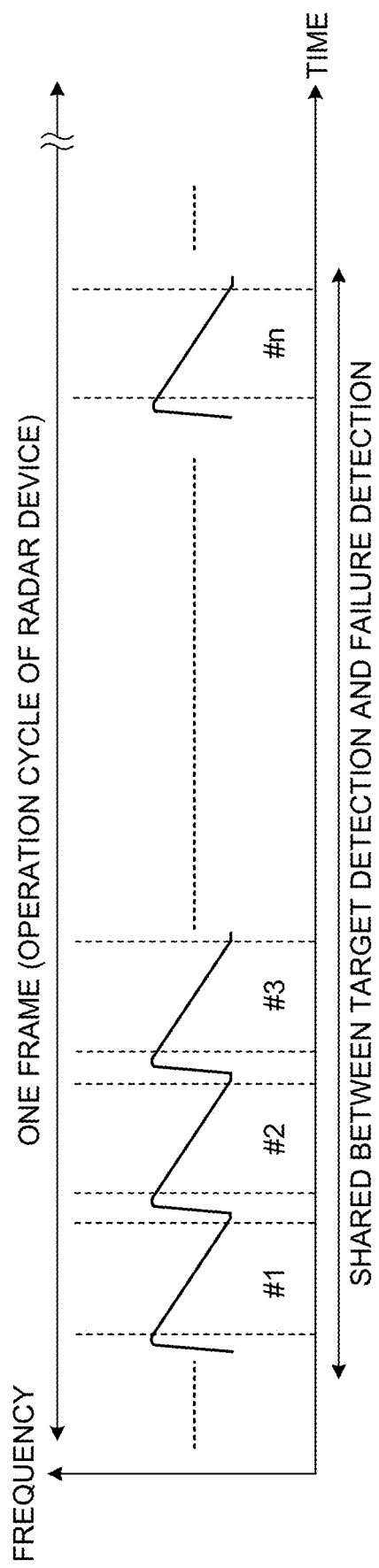
FIG. 29 is a first diagram provided for explaining a method of operating a radar device according to an eleventh embodiment.
Figure 30:
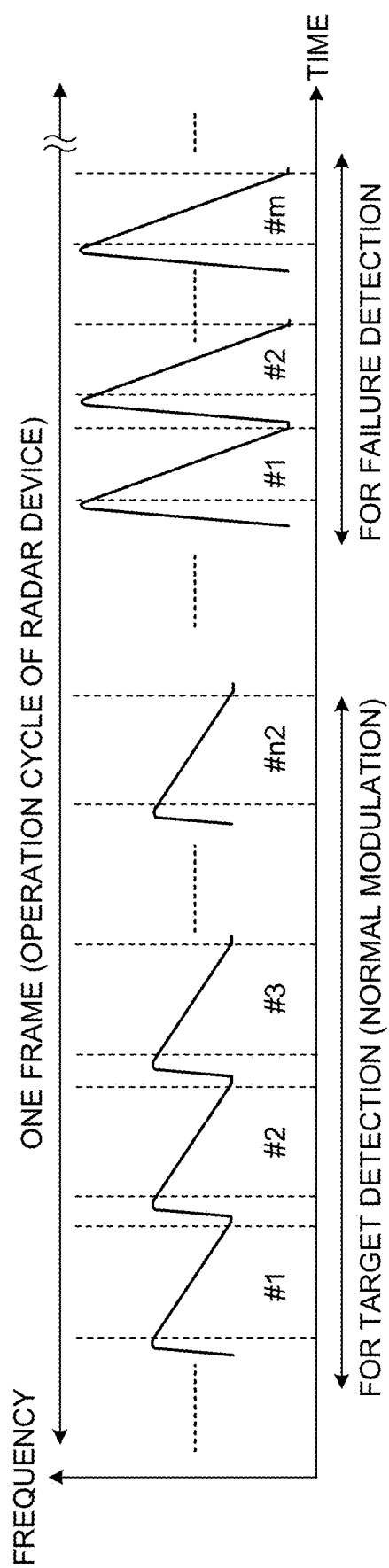
FIG. 30 is a second diagram provided for explaining a method of operating the radar device according to the eleventh embodiment.

Next, a method of operating a radar device according to an eleventh embodiment will be described with reference to FIGS. 29 and 30. FIG. 29 is a first diagram provided for explaining the method of operating the radar device according to the eleventh embodiment. FIG. 30 is a second diagram provided for explaining the method of operating the radar device according to the eleventh embodiment. Note that the eleventh embodiment can be implemented by the configuration in any of FIGS. 1, 10, and 11.

FIG. 29 illustrates a basic form of a transmission chirp signal and a reception chirp signal in the eleventh embodiment, where the chirp signal of the same waveform within one frame that is one operation cycle of the radar device is used for both detecting the target and detecting the failure. Moreover, FIG. 30 illustrates another example of operation of the transmission chirp signal and the reception chirp signal in the eleventh embodiment, where the chirp signal for target detection and the chirp signal for failure detection having different waveforms are transmitted and received in a time division manner within one frame that is one operation cycle of the radar device.

Here, the chirp signal for target detection is referred to as a "first chirp signal" while the chirp signal for failure detection is referred to as a "second chirp signal". The method for operating the radar device by the waveforms of FIG. 30 can be deemed as a mode of operation that includes first and second radar operation times within the operation cycle of the radar device. The first radar operation time is the time provided for detecting the target on the basis of the beat signal from the first chirp signal. The second radar operation time is the time provided for transmitting/receiving the second chirp signal and determining a failure of the radar device on the basis of the beat signal from the second chirp signal.

Note that an alternative form to the basic form illustrated in FIG. 29 and the time-division form illustrated in FIG. 30 may provide "P" frames ("P" is an integer of 2 or more) that is "P" times the one operation cycle, in which case one frame of the P frames may be operated for failure detection, and the remaining "P-1" frames may be operated for target detection. For this operation, either the chirp signal illustrated on the right side of FIG. 30 or the chirp signal subjected to normal modulation illustrated on the left side of FIG. 30 may be used as the chirp signal for failure detection. Note that the frame for target detection and the frame for failure detection can be switched by the control of the signal processing unit 4.

Figure 31:
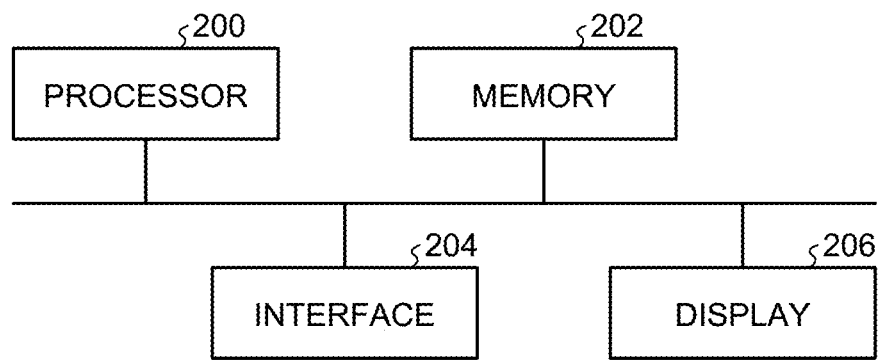
FIG. 31 is a block diagram illustrating an example of a hardware configuration that implements the functions of a signal processing unit in the first to eleventh embodiments.
Figure 32:
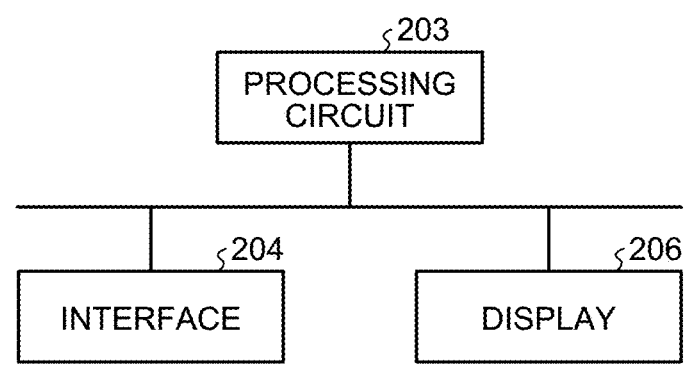
FIG. 32 is a block diagram illustrating another example of the hardware configuration that implements the functions of the signal processing unit in the first to eleventh embodiments.

Lastly, a hardware configuration for implementing the functions of the signal processing unit 4 in the first to eleventh embodiments will be described with reference to the FIGS. 31 and 32. FIG. 31 is a block diagram illustrating an example of the hardware configuration that implements the functions of the signal processing unit 4 in the first to eleventh embodiments. FIG. 32 is a block diagram illustrating another example of the hardware configuration that implements the functions of the signal processing unit 4 in the first to eleventh embodiments.

When the functions of the signal processing unit 4 in the first to eleventh embodiments are implemented by software, as illustrated in FIG. 31, the signal processing unit can include a processor 200 that performs an arithmetic operation, a memory 202 in/from which programs and threshold/temperature table values to be read by the processor 200 are saved and read, an interface 204 that inputs and outputs signals, and a display 206 that displays a detection result.

The processor 200 may be arithmetic means such as an arithmetic unit, a microprocessor, a microcomputer, a central processing unit (CPU), or a digital signal processor (DSP). The memory 202 can include, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, or a digital versatile disc (DVD).

The memory 202 stores (saves) the programs for executing the functions of the signal processing unit 4, the threshold/temperature table values, and the like. The processor 200 transmits and receives necessary information via the interface 204, executes the programs stored in the memory 202, and refers to the threshold/temperature table values stored in the memory 202, thereby being able to perform the failure determination processing and the processing of detecting the target 50 described above. A result of arithmetic operation by the processor 200 can be stored in the memory 202. A result of processing by the processor 200 can also be displayed on the display 206. Note that the display 206 may be included outside the signal processing unit 4.

Moreover, the processor 200 and the memory 202 illustrated in FIG. 31 may be replaced with a processing circuit 203 as in FIG. 32. The processing circuit 203 corresponds to a single circuit, a complex circuit, an application specific integrated circuit (ASIC), a field programmable gate array (FPGA), or a combination of those.

Note that the configuration illustrated in the aforementioned embodiment merely illustrates an example of the content of the present invention, and can thus be combined with another known technique or partially omitted and/or modified without departing from the scope of the present invention.

REFERENCE SIGNS LIST 1 transmission module; 2, 2A, 3, 3A reception module; 4 signal processing unit; 5 delay circuit; 11, 22, 32 RF signal source; 11a, 22a, 32a chirp generator circuit; 11b, 22b, 32b oscillator; 11c, 12, 22c, 23c, 32c, 33c amplifier; 13 transmitting antenna; 21, 31 receiving antenna; 23, 23A, 33 reception unit; 23a, 33a mixer; 23b, 23b1, 23b2, 33b HPF;

23*d*, 33*d* ADC; 41 chirp data generation unit; 42 timing control unit; 43 detection unit; 43*a* distance detection unit; 43*b* speed detection unit; 43*c* amplitude detection unit; 44 failure determination unit; 44*a* failure determination threshold table; 50 target; 52 radio wave absorption band; 60 transmitted chirp signal; 62 direct wave; 64 reflected wave; 100, 100A, 100B radar device; 200 processor; 202 memory; 203 processing circuit; 204 interface; 206 display.

The invention claimed is:

1. A radar device for detecting a target, the radar device comprising:
   at least one transmitter to generate a transmission chirp signal synchronized with a timing signal;
   at least two receivers to each receive a reflected wave and a direct wave of the transmission chirp signal emitted from the transmitter, and each perform mixing on a received signal, using a reception chirp signal, the reflected wave being reflected from a target, the direct wave providing direct coupling without passing through the target, the reception chirp signal being synchronized with the timing signal and having the same slope as the transmission chirp signal; and
   a signal processor to detect the target on the basis of a beat signal resulting from the mixing performed by the receivers, wherein
   the signal processor includes a function that detects a level of a direct wave component from the transmitter to the receivers, the direct wave component being included in the beat signal, and determines a failure of the radar device by comparing the detected level with a threshold, the threshold being set on the basis of a beat signal level measurement under an environment that eliminates the reflected wave component in advance, wherein
   the transmitted chirp signal distributed from the transmitter is used as the reception chirp signal.

2. The radar device according to claim 1, wherein the transmission chirp signal and the reception chirp signal are output with their chirp start timings shifted from each other.

3. The radar device according to claim 1, wherein the signal processor detects a relative speed from the beat signal and extracts the direct wave from a component in which the relative speed detected is zero.

4. The radar device according to claim 1, wherein a slope of each of the transmission chirp signal and the reception chirp signal at the time of failure detection is set to be larger than a slope of each of the transmission chirp signal and the reception chirp signal at the time of target detection.

5. The radar device according to claim 1, wherein the receivers each include a high-pass filter that filters the beat signal, and a cut-off frequency of the high-pass filter is switched between the time of target detection and the time of failure detection.

6. The radar device according to claim 1, wherein,
   for a direct wave of each of a plurality of transmission/reception paths formed by at least the one transmitter and at least the two receivers,
   the signal processor detects a level of the direct wave of each of a plurality of the transmission/reception paths and performs failure determination for each of the transmission/reception paths by comparing the level with a threshold set for each of the transmission/reception paths.

7. A radar device for detecting a target, the radar device comprising:
   at least one transmitter to generate a transmission chirp signal synchronized with a timing signal;
   at least two receivers to each receive a reflected wave and a direct wave of the transmission chirp signal emitted from the transmitter, and each perform mixing on a received signal, using a reception chirp signal, the reception chirp signal being synchronized with the timing signal and having the same slope as the transmission chirp signal; and
   a signal processor to detect a target on the basis of a beat signal resulting from the mixing performed by the receivers, wherein
   the signal processor determines presence or absence of a failure of the radar device on the basis of a threshold, the threshold being set from a difference between a level of a direct wave component in the beat signal in a state of no frequency modulation, and a level of the direct wave component in the beat signal in a state of frequency modulation.

8. A method for operating a radar device that includes: at least one transmitter to generate a transmission chirp signal synchronized with a timing signal; at least two receivers to each receive a reflected wave and a direct wave of the transmission chirp signal emitted from the transmitter, and each perform mixing on a received signal, using a reception chirp signal, the reception chirp signal being synchronized with the timing signal and having the same slope as the transmission chirp signal; and a signal processor to analyze a beat signal resulting from the mixing performed by the receivers, the signal processor detecting a target from a reflected wave component of the beat signal resulting from the mixing performed by the receivers, detecting a level of a direct wave component of the beat signal, and determining a failure of the device by comparing the detected level with a threshold, the threshold being set on the basis of a beat signal level measurement under an environment that eliminates the reflected wave component in advance,
   wherein the detection of the target and the determination of a failure in the radar device are performed on the basis of the beat signal of a common chirp signal transmitted and received within an operation cycle of the radar device, and wherein
   the threshold is set for each ambient temperature of the radar device,
   the threshold is saved, in a memory of the signal processor, as a temperature table value set for a direct wave of a plurality of transmission/reception paths formed by at least the one transmitter and at least the two receivers, and
   the signal processor performs failure determination on the radar device by setting the threshold corresponding to each of a plurality of the transmission/reception paths by interpolating or referring to a corresponding one of the temperature table value on the basis of the level of the direct wave component in each beat signal.

9. A method for operating a radar device that includes: at least one transmitter to generate a transmission chirp signal synchronized with a timing signal; at least two receivers to each receive a reflected wave and a direct wave of the transmission chirp signal emitted from the transmitter, and each perform mixing on a received signal, using a reception chirp signal, the reception chirp signal being synchronized with the timing signal and having the same slope as the transmission chirp signal; and a signal processor to analyze a beat signal resulting from the mixing performed by the receivers, the signal processor detecting a target from a reflected wave component of the beat signal resulting from the mixing performed by the receivers, detecting a level of a direct wave component of the beat signal, and determining a failure of the device by comparing the detected level with a threshold, the threshold being set on the basis of a beat signal level measurement under an environment that eliminates the reflected wave component in advance, wherein
the transmission chirp signal and the reception chirp signal include:
a first chirp signal for target detection and a second chirp signal for failure detection; and
first and second radar operation times within an operation cycle of the radar device, the first radar operation time being a time in which the first chirp signal is transmitted and received so that the target is detected on the basis of a beat signal from the first chirp signal, the second radar operation time being a time in which the second chirp signal is transmitted and received so that a failure of the radar device is determined on the basis of a beat signal from the second chirp signal, and wherein
the threshold is set for each ambient temperature of the radar device,
the threshold is saved, in a memory of the signal processor, as a temperature table value set for a direct wave of a plurality of transmission/reception paths formed by at least the one transmitter and at least the two receivers, and
the signal processor performs failure determination on the radar device by setting the threshold corresponding to each of a plurality of the transmission/reception paths by interpolating or referring to a corresponding one of the temperature table value on the basis of the level of the direct wave component in each beat signal.

10. A method for operating a radar device that includes: at least one transmitter to generate a transmission chirp signal synchronized with a timing signal; at least two receivers to each receive a reflected wave and a direct wave of the transmission chirp signal emitted from the transmitter, and each perform mixing on a received signal, using a reception chirp signal, the reception chirp signal being synchronized with the timing signal and having the same slope as the transmission chirp signal; and a signal processor to analyze a beat signal resulting from the mixing performed by the receivers, the signal processor detecting a target from a reflected wave component of the beat signal resulting from the mixing performed by the receivers, detecting a level of a direct wave component of the beat signal, and determining a failure of the device by comparing the detected level with a threshold, the threshold being set on the basis of a beat signal level measurement under an environment that eliminates the reflected wave component in advance, wherein
the transmission chirp signal and the reception chirp signal
include a first chirp signal for target detection and a second chirp signal for failure detection; and
have a first radar operation cycle in which the first chirp signal is transmitted and received so that the target is detected on the basis of a beat signal from the first chirp signal, and a second radar operation cycle in which the second chirp signal is transmitted and received so that a failure of the radar device is determined on the basis of a beat signal from the second chirp signal, and
the second radar operation cycle is controlled on the basis of a timing signal output from the signal processor, and is included at least once within a plurality of cycles of the first radar operation, and wherein
the threshold is set for each ambient temperature of the radar device,
the threshold is saved, in a memory of the signal processor, as a temperature table value set for a direct wave of a plurality of transmission/reception paths formed by at least the one transmitter and at least the two receivers, and
the signal processor performs failure determination on the radar device by setting the threshold corresponding to each of a plurality of the transmission/reception paths by interpolating or referring to a corresponding one of the temperature table value on the basis of the level of the direct wave component in each beat signal.

11. A radar device for detecting a target, the radar device comprising:
at least one transmitter to generate a transmission chirp signal synchronized with a timing signal;
at least two receivers to each receive a reflected wave and a direct wave of the transmission chirp signal emitted from the transmitter, and each perform mixing on a received signal, using the reception chirp signal, the reception chirp signal being synchronized with the timing signal and having the same slope as the transmission chirp signal; and
a signal processor to detect a target on the basis of a beat signal resulting from the mixing performed by the receivers, wherein
the signal processor determines presence or absence of a failure of the radar device on the basis of a threshold, the threshold being set from a difference between a level of a direct wave component in the beat signal when the transmission chirp signal is emitted and a level of the direct wave component in the beat signal when the transmission chirp signal is not emitted.

* * * * *